(12) United States Patent
McKay

(10) Patent No.: US 7,024,721 B2
(45) Date of Patent: Apr. 11, 2006

(54) CLEANING MAT WITH A PLURALITY OF DISPOSABLE SHEETS

(75) Inventor: William D. McKay, Grand Blanc, MI (US)

(73) Assignee: Rapid Brands Corporation, Grand Blanc, MI (US)

( * ) Notice: Subject to any disclaimer, the term of this patent is extended or adjusted under 35 U.S.C. 154(b) by 465 days.

(21) Appl. No.: 10/288,874

(22) Filed: Nov. 6, 2002

(65) Prior Publication Data

US 2003/0135947 A1    Jul. 24, 2003

Related U.S. Application Data

(63) Continuation-in-part of application No. 10/261,150, filed on Sep. 30, 2002, which is a continuation-in-part of application No. 09/979,415, filed on Mar. 11, 2002, now abandoned, and a continuation-in-part of application No. 09/993,137, filed on Nov. 16, 2001, now Pat. No. 6,810,554, which is a continuation-in-part of application No. 09/599,307, filed on Jun. 22, 2000, now Pat. No. 6,458,442, which is a continuation-in-part of application No. 09/602,189, filed as application No. PCT/US99/12945 on Jun. 11, 1999, now Pat. No. 6,405,403, which is a continuation-in-part of application No. 09/094,551, filed on Jun. 12, 1998, now Pat. No. 6,298,517.

(60) Provisional application No. 60/356,031, filed on Feb. 11, 2002, provisional application No. 60/333,101, filed on Nov. 6, 2001, provisional application No. 60/311,463, filed on Aug. 11, 2001, provisional application No. 60/260,969, filed on Jan. 10, 2001.

(51) Int. Cl.
*A47L 23/22* (2006.01)

(52) U.S. Cl. .............................. 15/215; 15/231; 428/68; 428/119; 428/120

(58) Field of Classification Search .......... 15/215–217, 15/231; 428/68, 119, 120
See application file for complete search history.

(56) References Cited

U.S. PATENT DOCUMENTS

| 3,083,393 A | 4/1963 | Nappi |
| 3,663,980 A | 5/1972 | Conklin |
| 4,107,811 A | 8/1978 | Imsande ...................... 15/215 |

(Continued)

*Primary Examiner*—Mark Spisich
(74) *Attorney, Agent, or Firm*—Gifford, Krass, Groh, Sprinkle, Anderson & Citkowski, P.C.

(57) ABSTRACT

A cleaning mat system is designed for placement on a floor and for cleaning the undersides of shoes, feet, and other objects. The cleaning mat system includes a base with an upper surface and a lower surface interconnected by a perimeter edge. The perimeter edge includes a leading edge and an opposed trailing edge. The upper surface of the base includes upwardly extending teeth covering the majority of the upper surface, and the lower surface includes downwardly extending teeth on at least a portion of the lower surface adjacent the leading and trailing edges. A removable and disposable cleaning sheet has an upper face for cleaning and an opposed lower face. The cleaning sheet has a pair of spaced-apart side edge portions and a central portion. In use, the cleaning sheet is positioned on the base such that the central portion is adjacent the upper surface of the base and the side edge portions wrap around the leading and trailing edges to be trapped between the teeth and the floor.

17 Claims, 16 Drawing Sheets

U.S. PATENT DOCUMENTS

| | | |
|---|---|---|
| 4,143,194 A | 3/1979 | Wihksne |
| 4,564,546 A | 1/1986 | Jones |
| 5,018,235 A | 5/1991 | Stamatiou et al. ............ 15/215 |
| 5,071,628 A | 12/1991 | Alazet |
| 5,142,733 A | 9/1992 | Mogel et al. .................... 16/8 |
| 5,658,270 A | 8/1997 | Lichstein .................... 604/387 |
| 5,674,341 A | 10/1997 | Ng .............................. 156/234 |
| 5,834,104 A | 11/1998 | Cordani ...................... 428/218 |
| 5,910,137 A | 6/1999 | Clark et al. ................. 604/387 |
| 6,017,454 A | 1/2000 | Horl et al. ............. 210/321.68 |
| 6,233,776 B1 | 5/2001 | Blum et al. ................... 15/215 |
| 6,458,442 B1 | 10/2002 | McKay ...................... 428/40.1 |

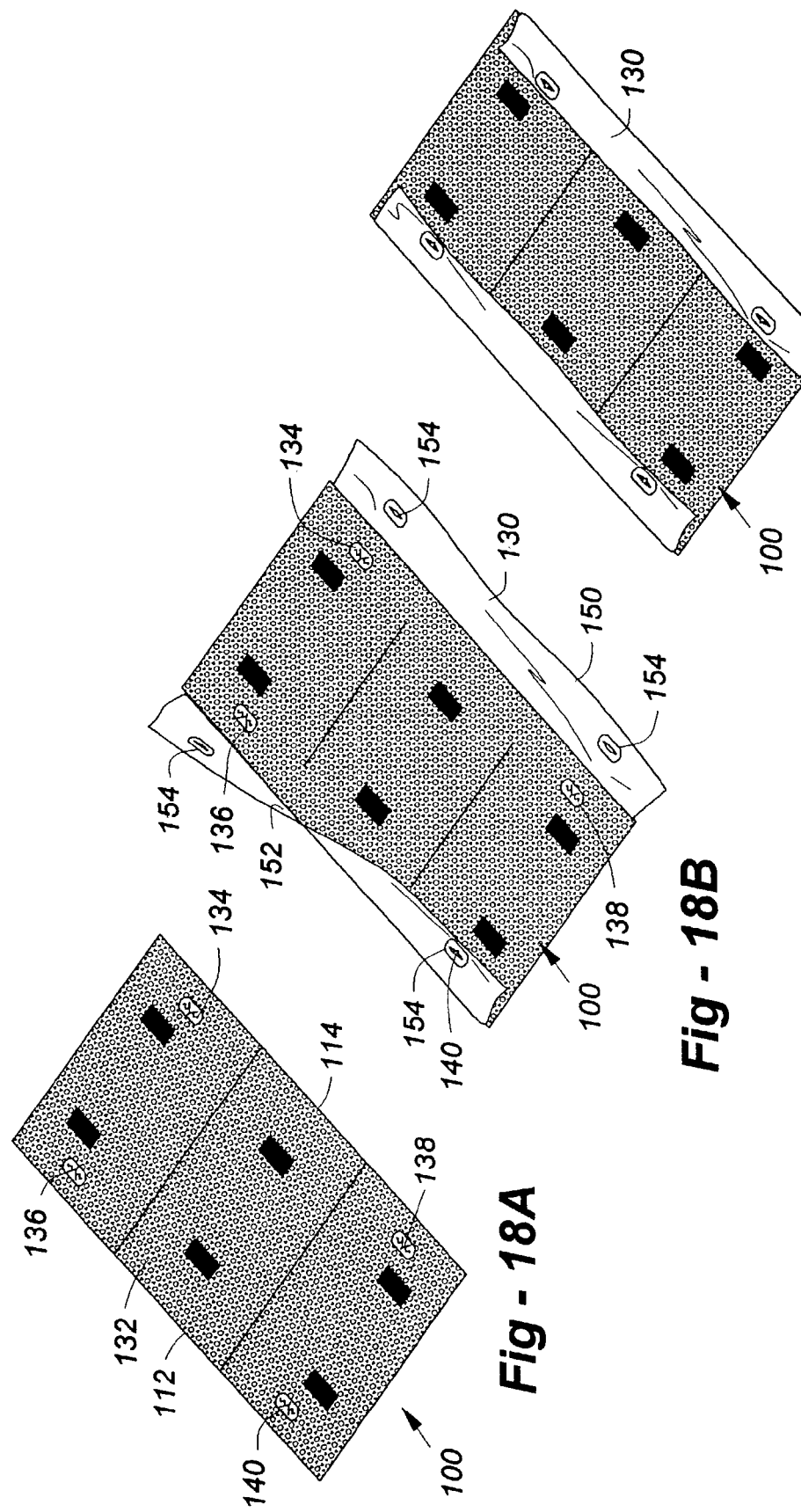

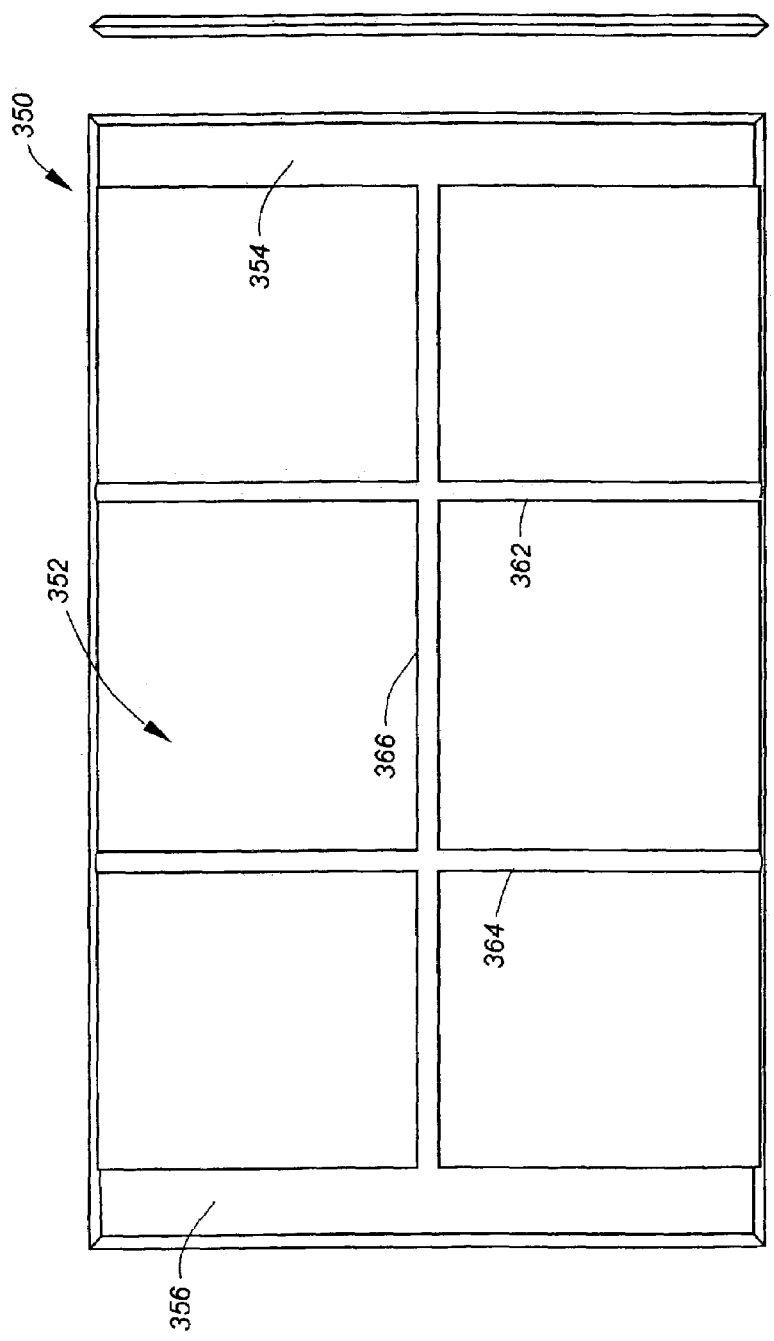
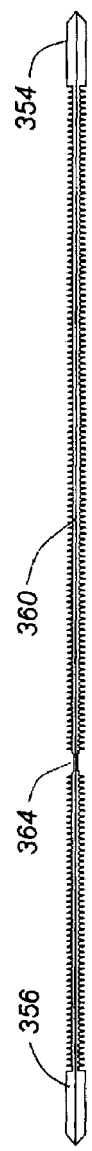
Fig - 29
Fig - 30

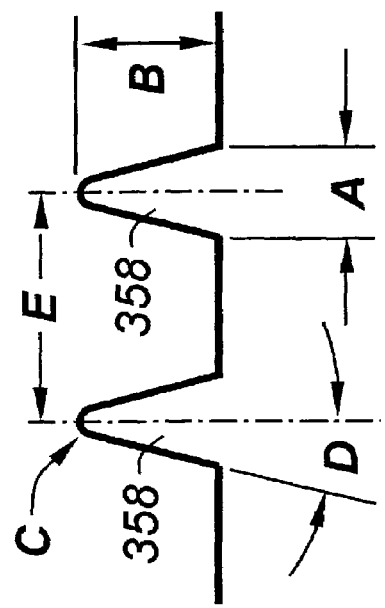
Fig - 31
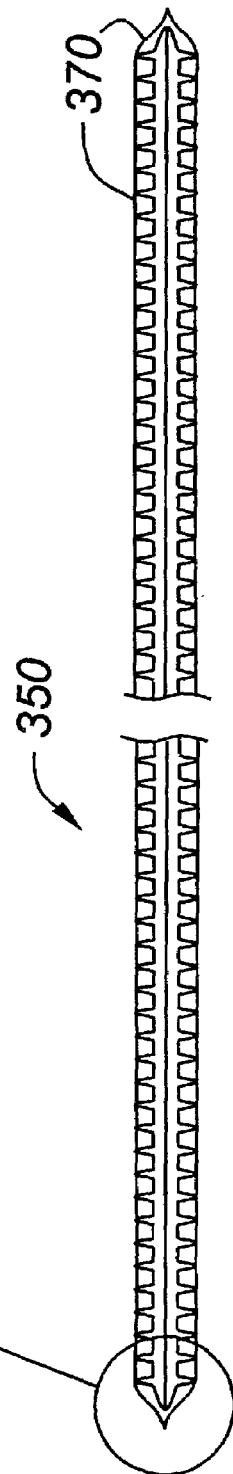
Fig - 32
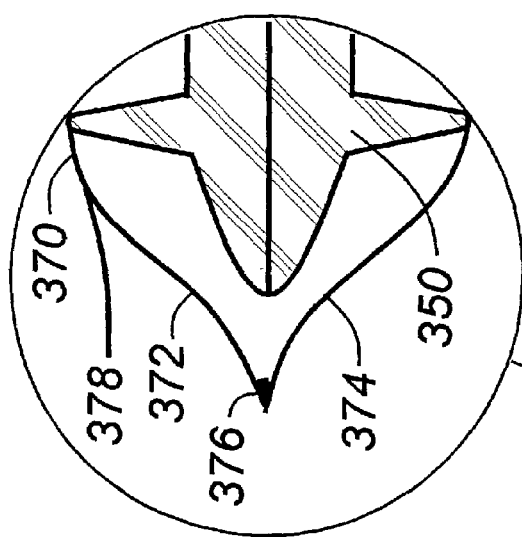

CLEANING MAT WITH A PLURALITY OF DISPOSABLE SHEETS

REFERENCE TO RELATED APPLICATIONS

This application is a continuation-in-part of U.S. patent application Ser. No. 10/261,150, filed Sep. 30, 2002;

which is a continuation-in-part of U.S. patent application Ser. No. 09/599,307, filed Jun. 22, 2000 U.S. Pat. No. 6,458,442; and a continuation-in-part of U.S. patent application Ser. No. 09/993,137, filed Nov. 16, 2001 U.S. Pat. No. 6,810,554;

which is a continuation-in-part of U.S. patent application Ser. No. 09/979,415, filed Jun. 11, 1999 abandoned;

which is a national stage of PCT/US99/12945, filed Jun. 11, 1999;

and is a continuation-in-part of U.S. patent application Ser. No. 09/602,189, filed Jun. 12, 2000, now U.S. Pat. No. 6,405,403;

which is a continuation-in-part of U.S. patent application Ser. No. 09/094,551, filed Jun. 12, 1998, now U.S. Pat. No. 6,298,517; and claims benefit of U.S. provisional patent application Ser. No. 60/260,969, filed Jan. 10, 2001; and claims benefit of U.S. provisional patent application Ser. No. 60/311,463, filed Aug. 11, 2001; and claims priority to U.S. provisional patent application Ser. No. 60/356,031, filed Feb. 11, 2002, and No. 60/333,101, filed Nov. 6, 2001, the entire contents of each application being incorporated herein by reference.

FIELD OF THE INVENTION

The present invention relates generally to rugs and cleaning mats and, more specifically, to a cleaning mat with a plurality of removable and disposable cleaning sheets.

BACKGROUND OF THE INVENTION

As people, pets, and objects move from place to place, their feet or wheels often pick up dirt and debris, which is carried along as they move. The dirt and debris is thereby spread to other places, such as the interiors of houses, offices, and hospitals. Obviously, it is desirable to prevent the spread of dirt and debris, and many attempts have been made to do so. Chief among these are rugs and mats that are placed in the entryways of homes, offices, and hospitals. It is hoped that these rugs or mats will remove and retain some of the dirt and debris from the shoes and wheels of people, pets, and objects. However, this is often not the case. In many situations, these rugs and mats are not frequently or sufficiently cleaned and are themselves a source of dirt and debris. Also, even a clean rug or mat often does a poor job of removing dirt and debris from feet and wheels. These mats and rugs also preferably remove liquid from feet and wheels. However, they often do an insufficient job of this as well. They may have limited absorption and may also become quickly wetted where they no longer can absorb additional liquid.

The problem of dirt and debris on the shoes of people is especially worrisome in hospital operating rooms and manufacturing clean room facilities. For these purposes, "tacky mats" have been developed. These mats typically consist of a plurality of layers of thin plastic with adhesive coated on the upper surface of each layer. In theory, a person walks across the mat and the adhesive grabs the dirt and debris from the underside of their shoes. Once the mat is sufficiently covered with dirt and debris, the soiled layer is peeled from the remaining layers to expose a fresh layer with fresh adhesive. Examples of these types of mats are disclosed and explained in U.S. Pat. Nos. 4,107,811 to Imsande and 4,559,250 to Paige. While this type of mat may have limited applicability, it suffers from numerous shortcomings. The plastic layers easily tear when removed and also require users to carefully walk across them to avoid tearing in use. The adhesive on the layers only removes dirt and debris that is lightly attached to the underside of the shoes. If the shoes are more heavily soiled, it is impossible for the user to wipe their feet, since doing so would likely tear the plastic sheet. Probably the most serious drawback of this type of mats is that they are absolutely incapable of absorbing liquids from the bottom of shoes. Therefore, they are only suited for applications where it is known that the shoes are already dry. Hence, the mats cannot be used in entryways to buildings where shoes may be heavily soiled and/or wet.

A slight improvement is provided by a tacky mat disclosed and explained in U.S. Pat. No. 3,665,543 to Nappi. In this version, a gauze sheet is embedded in the adhesive layer and fully saturated with adhesive. The gauze sheet serves the dual purposes of strengthening the plastic underlayer and providing a rougher upper surface to improve retention of dirt and debris. However, this mat still fails to address the need to absorb liquids. It also is only suitable for very light wiping since the gauze layer is insubstantial.

A different approach to the mat or rug problem is taken by U.S. Pat. Nos. 5,506,040 and 5,834,104 to Cordani and U.S. Pat. No. 5,173,346 to Middleton. In each of these patents, an absorbent layer overlies a moisture barrier layer. The absorbent layer absorbs liquid and the moisture barrier layer prevents the liquid from transferring out of the mat. In the case of the Middleton patent, the absorbent mat is designed to catch and absorb fluids which drip from an operating table during surgery. Therefore, the absorbent layer is highly absorbent and retentive of fluid, but is not designed to be walked across as with a normal rug or mat used in an entryway. The Cordani patents disclose mats which are designed for use in entryways. Therefore, the absorbent layer is designed to be walked across and absorbs liquid and tolerates at least some wiping of shoes. However, the Cordani mats lack the tackiness of the previously discussed "tacky mats" and therefore have limited capability to grab dirt and debris from the shoes of people walking over the mat. Also, the Cordani mats are only a single layer and therefore lack the functionality of the plurality of sheets used in a typical tacky mat. A significant advantage to the stacked tacky mats is that users may very easily "clean" the mat by simply peeling off and disposing of the uppermost layer. With the Cordani mats, the entire mat must be replaced. This discourages "cleaning."

In light of the above, there remains a need for a cleaning mat or rug which encourages users to "clean" the mat whenever the mat becomes soiled, is capable of tolerating wiping, absorbs liquids, and has the capability to grab and retain dirt and debris.

SUMMARY OF THE INVENTION

The present invention overcomes many of the shortcomings of the prior art. A cleaning mat according to the present invention is designed to be placed on a floor and to clean the undersides of shoes, feet, and other objects. The cleaning pad includes a base sheet which is designed to rest on the floor. The base sheet has an upper surface and lower surface with the lower surface designed to contact the floor. Multiple removable and disposable cleaning sheets are supported in a stacked configuration on the upper surface of the base sheet. Each of the cleaning sheets includes an upper bibulous layer having an upper face. The bibulous layer is designed to absorb liquid from an object which contacts the upper face. Each cleaning sheet also includes a lower moisture barrier layer which has an upper face adjacent the bibulous layer. The barrier layer is operative to prevent transport of liquid from the bibulous layer to other cleaning sheets below the barrier layer. In some embodiments, an adhesive covers a portion of the upper face of the upper bibulous layer and is designed to grab and retain dirt and debris that comes into contact with the upper face. A portion of the upper face remains non-occluded such that absorbency is maintained. In other embodiments, a plurality of perforations are provided through the upper bibulous layer to retain debris. In yet other embodiments, the moisture barrier layer extends beyond the edges of the bibulous layer to define a perimeter surrounding the bibulous layer. The perimeter of each of the cleaning sheets may be bonded together with adhesive so as to seal in unexposed bibulous layers.

An alternative embodiment of the present invention provides a cleaning mat system with a base designed to rest on the floor. The base has an upper surface and a lower surface interconnected by a perimeter edge, with the perimeter edge including a leading edge and an opposed trailing edge. The base also includes multiple gripping members defined on the lower surface. At least one of the gripping members is adjacent each of the leading and trailing edges. The lower surface of the base is designed to be supported on the floor. The cleaning mat system also includes a removable and disposable cleaning sheet with an upper face for cleaning and an opposed lower face. The cleaning sheet has a pair of spaced apart side edges. The cleaning sheet includes an upper fabric layer with an upper face that defines the upper face of the cleaning sheet. The upper layer of the cleaning sheet is operative to clean an object which contacts the upper face. The cleaning sheet also has a lower reinforcement layer with an upper face which is adjacent the upper layer and an opposed lower face which defines the lower face of the cleaning sheet. The lower reinforcement layer supports and reinforces the upper layer. The cleaning sheet is disposed on the base such that the lower face is adjacent the upper surface of the base. One of the side edges of the cleaning sheet engages one of the gripping members on the lower surface of the base and the other side edge engages another of the gripping members on the lower surface of the base such that the cleaning sheet is retained on the base with the upper face directed upwardly to clean an object that contacts the cleaning mat system. In further embodiments, the reinforcement layer is dispensed with, with the cleaning sheet consisting of a fabric layer. In other embodiments, multiple cleaning sheets are provided in a stacked configuration, with the uppermost cleaning sheet being removable after it is soiled. In yet further embodiments, the cleaning sheets are provided as cleaning sleeves with an opening that receives the base. The cleaning sheet is then retained on the base by the base being received in the opening and the cleaning sleeve wrapping about the base with a fabric surface directed upwardly.

Alternative embodiments provide a base with upwardly extending teeth on the upper surface and a cleaning sheet or sleeve is partially penetrated by these teeth. The teeth cooperate with the sheet to help retain it in position on the floor mat base.

BRIEF DESCRIPTION OF THE DRAWINGS

FIG. 18A is a bottom view of the base of FIGS. 13 and 14, without a cleaning sheet installed;

FIG. 18B is a bottom view similar to FIG. 18A, with a cleaning sheet partially installed;

FIG. 18C is a bottom view similar to FIGS. 18A and 18B, with a cleaning sheet completely installed;

FIG. 29 is a plan view of the base of FIG. 28;

FIG. 30 is a cross-sectional side view of the base of FIGS. 28 and 29;

FIG. 31 is a detailed view of the teeth for use with the base of FIGS. 28–30;

FIG. 32 is a cross-sectional end view of the base of FIGS. 28–30 with a disposable sleeve disposed thereon;

DETAILED DESCRIPTION OF THE PREFERRED EMBODIMENTS

Figure 1:
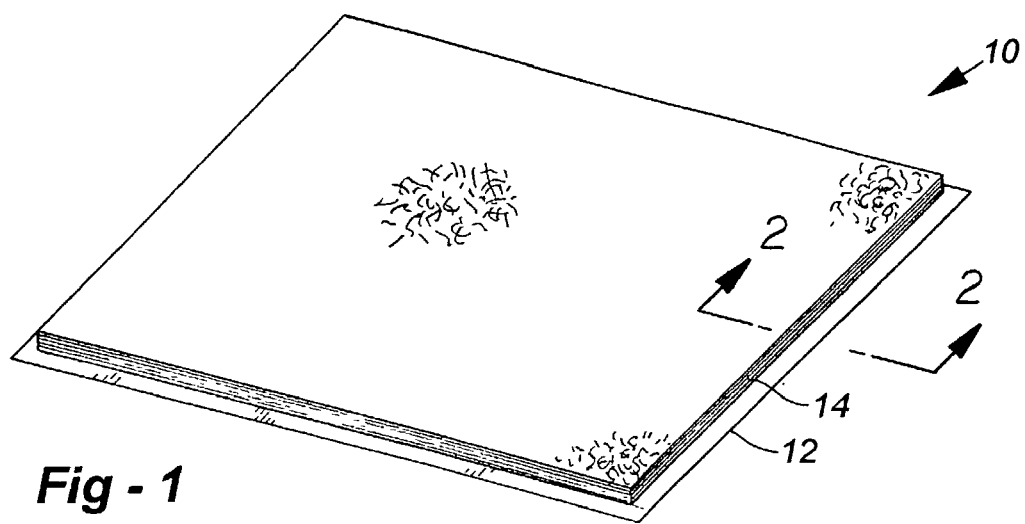
FIG. 1 is a perspective view of a first embodiment of a cleaning mat according to the present invention.
Figure 2:
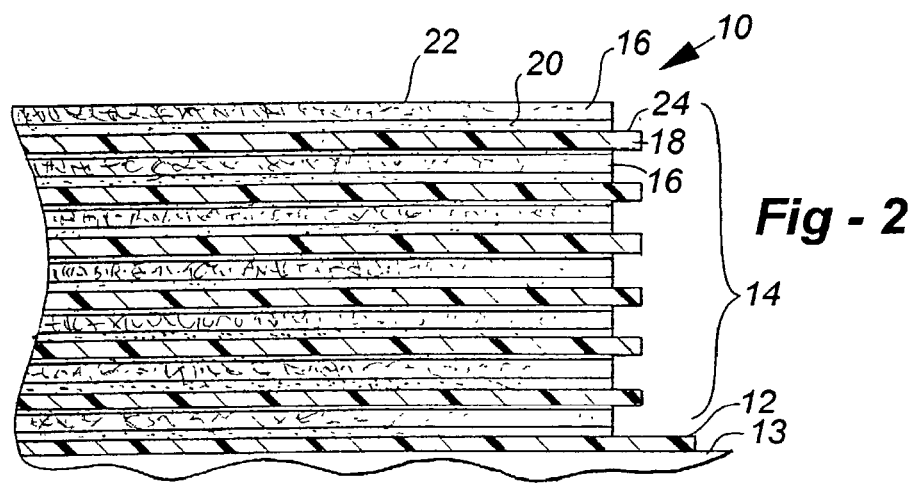
FIG. 2 is a cross-sectional view of a portion of the cleaning mat of FIG. 1 taken along lines 2—2.

Referring to FIGS. 1 and 2, a first embodiment of a cleaning mat according to the present invention is generally shown at 10. The cleaning mat 10 is designed to be positioned on a floor such as in an entryway of a house or office. It is sized to be sufficiently large such that the person walking across the mat may easily step on an upper surface of the mat and clean their feet. As will be clear to those of skill in the art, the size and shape of the mat 10 may vary depending on the application. The mat 10 preferably includes a base sheet 12 which is designed to lay on the floor 13. The base sheet 12 has a lower surface which contacts the floor 13 and an upper surface which faces away from the floor 13. A plurality of removable and disposable cleaning sheets 14 is supported in a stacked configuration on the upper surface of the base sheet 12.

As best shown in FIG. 2, each of the cleaning sheets includes an upper bibulous layer 16 and a lower moisture barrier layer 18. The bibulous layer 16 and moisture barrier layer 18 are preferably bonded to one another such as by adhesive 20. The bibulous layer 16 is designed to absorb liquid from a shoe or object which contacts its upper face 22. Therefore, when a person walks across the uppermost cleaning sheet and contacts the upper face 22 of the uppermost bibulous layer 16, the bibulous layer 16 absorbs liquid from the person's shoes. Also, the bibulous layer is preferably tough enough to withstand wiping of shoes on its upper surface 22. As will be clear to those of skill in the art, the bibulous layer 16 may be constructed from any of a variety of materials. For example, non-woven substrates such as spunlace, airlaid, wet laid, rayon, polyester, melt blown felt or any other non-woven fabric may be used; woven fabrics may also be used for particular applications. Spunlace is preferred because the non-woven has loft or fuzz. This requires less tacky adhesive on the back side of the moisture barrier layer which holds the stack in place and provides for easy separation of stacked sheets. It also does a better job collecting debris. Because the bibulous layer 16 is designed to absorb liquid, some embodiments of the present invention include a super absorbent powder additive in the bibulous layer. Examples of the super absorbent powder additives may be found in children's diapers. They are typically gel-like substances which absorb many times their weight in liquid and retain liquid.

Obviously, it is preferred that the moisture absorbed by the bibulous layer 16 is retained by the bibulous layer. That way, once the uppermost sheet 14 becomes soiled, that sheet 14 may be peeled away to reveal a fresh sheet. The moisture barrier layer 18 is operative to prevent transport of liquid out of the bibulous layer 16 into adjacent bibulous layers. The moisture barrier layer 18 may be plastic such as polypropylene or polyethylene. Other examples of materials for the moisture barrier layer include nylon, waterproof paper, Tyvek®, Suralyn and Mylar.

Figure 12:
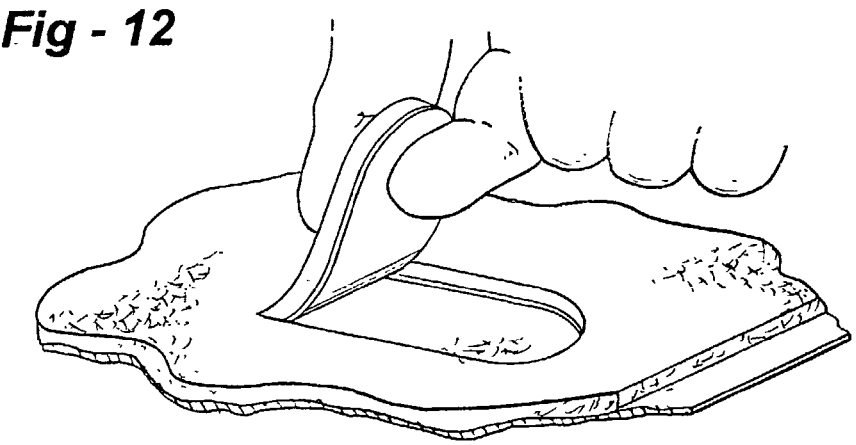
FIG. 12 is a detail view of a tab for use with the various embodiment of the present invention.

As shown in FIG. 2, it is preferred that the moisture barrier layer 18 be coextensive with the bibulous layer 16 and extend somewhat beyond the edges of the absorbent layer 16 so as to define a perimeter portion 24 surrounding the bibulous layer 16. This perimeter portion 24 helps to prevent liquid from running out the sides of the bibulous layer 16 and contaminating underlying bibulous layers. As an alternative to this approach, the perimeter portion 24 of the moisture barrier 18 may be turned up at its edges to better surround the bibulous layer 16. Of course, the moisture barrier layer 18 may be trimmed to match the edges of the bibulous layer 16 and eliminate the perimeter portion 24 if so desired. Also, the moisture barrier layer 18 may be a layer of material applied directly to the underside of the bibulous layer 16. For example, a waterproof coating may be applied to the underside of the bibulous layer. As a further alternative, the moisture barrier layer 18 and bibulous layer 16 may be melt bonded or extrusion bonded to one another rather than interconnected by adhesive 20. In the embodiment of FIGS. 1 and 2, a light layer of adhesive is applied to the underside of the moisture barrier layer 18 in order to interconnect it with the immediately adjacent bibulous layer 16. This adhesive acts to retain the plurality of cleaning sheets 14 in their stacked configuration. To remove an upper soiled layer, a user merely grasps the perimeter portion 24 of the soiled layer and pulls upwardly to remove it from the remaining cleaning sheets. As an alternative, the adhesive 26 on the underside of the moisture barrier layer 18 may be left off in certain areas or around the entire perimeter to ease peeling of the soiled layer. Also, pull tabs or other removal aids may be provided. An example of a pull tab for use with the present invention is shown in FIG. 12. As a further alternative, a portion of the area wherein the layers interconnect may be coated with a release agent or release layer to ease peeling.

Figure 3:
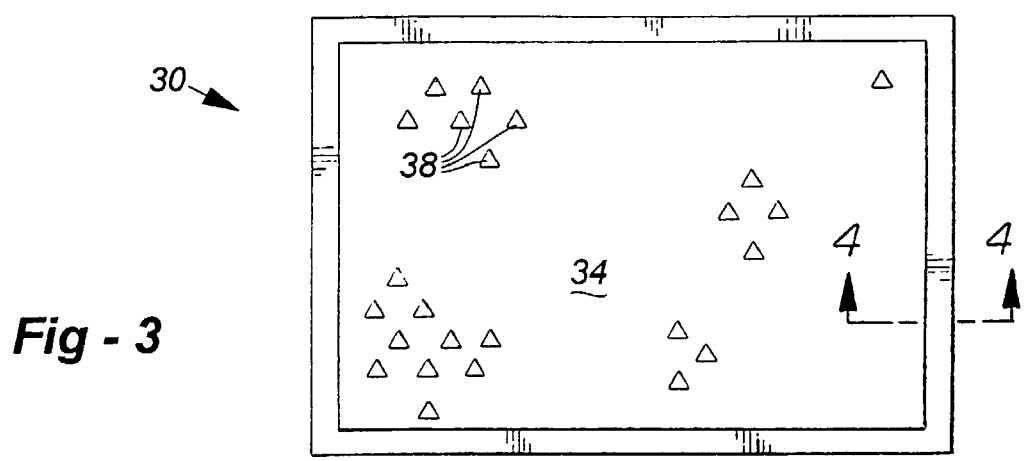
FIG. 3 is a top plan view of a second embodiment of a cleaning mat according to the present invention.
Figure 4:
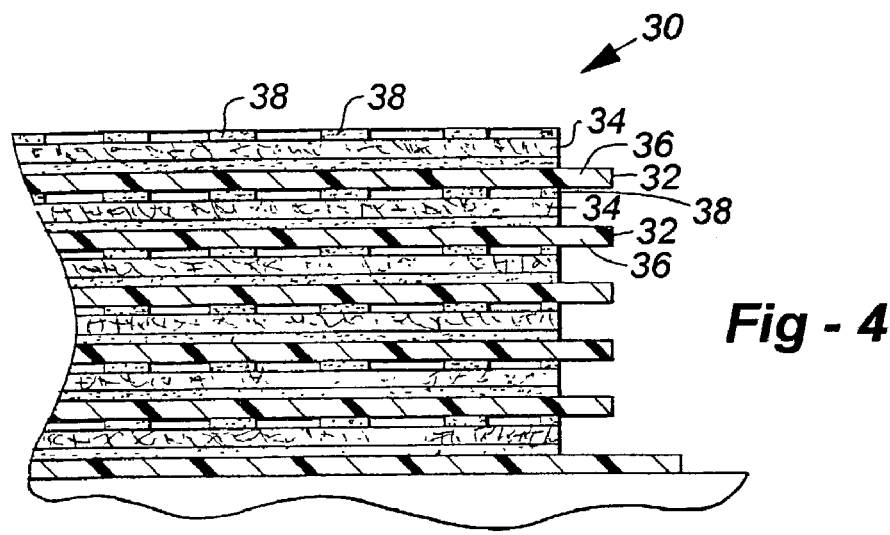
FIG. 4 is a cross-sectional view of a portion of the cleaning mat of FIG. 3 taken along lines 4—4.

Turning now to FIGS. 3 and 4, a second embodiment of a cleaning mat according to the present invention is generally shown at 30. This embodiment differs from the first embodiment shown in FIGS. 1 and 2 in two respects. First, the moisture barrier layers 32 are shown extending further from the edges of the bibulous layers 34 so as to define a larger perimeter portion 36. Secondly, a pattern coated adhesive layer 38 is shown applied to the upper surface of each of the bibulous layers 34. The pattern coated adhesive layer 38 makes the upper surface of the bibulous layer 34 tacky so that dirt and debris is "grabbed" from the soles of shoes and other objects that come in contact with the mat 30. By pattern coating, it is meant that the adhesive layer 38 covers only a portion of the upper face of the bibulous layer 34, so that the absorbency of the bibulous layer 34 is retained.

In FIG. 3, the adhesive layer 38 is shown consisting of a plurality of triangular shaped adhesive patches distributed across the upper surface of the bibulous layer 34. Obviously, other patterns may be used as well. This may include a very light flood coating of adhesive applied to the upper surface of the bibulous layer. While this very light layer could be considered to cover the entire upper surface, the lightness of the layer and the irregular upper surface of the bibulous layer actually cause the adhesive to remain porous such that absorbency is maintained. Alternatively, or in addition to the adhesive, the upper surface of the bibulous layer may be treated so as to have a static charge to further enhance its ability to collect dirt and debris.

As a further possibility, the threads or fiber which make up the woven or non-woven fabric of the bibulous layer may themselves be naturally sticky, or treated or partially coated with a tackifier such that they have some tackiness and grab and retain dirt and debris. As will be clear to those of skill in the art, the pattern coated adhesive may operate to interconnect the various cleaning sheets of the mat 30 such that adhesive on the underside of the moisture barrier layer 32 is eliminated. This is illustrated in FIG. 4. If the bibulous layer consists of fibers which are treated with a tackifier, this adhesive or tackifier by itself may be sufficient to interconnect the bibulous layer with the adjacent moisture barrier layer and/or to retain the cleaning sheets in their stacked configuration.

As a further alternative, with all embodiments of the present invention, the bibulous layers may be impregnated with a solution such as cleaning solution or a germicide. A germicide may also be incorporated in a pattern coated adhesive. Other cleaning materials may also be pattern coated onto the upper surface of the bibulous layers. These various cleaning solutions may act to sterilize or further clean shoes, paws, or wheels. The solution may be applied to the bibulous layer by flooding it, dipping it, or pattern coating it. One example of a cleaning solution is a dusting oil. Also, the bibulous layer may be treated with a perfume or perfume oil.

As mentioned previously, the second embodiment of the cleaning mat 30 also differs from the first embodiment in that the perimeter portion 36 is larger than on the first embodiment. Obviously, these features may be "mixed and matched" among the various embodiments as best suits the application. The larger perimeter portion 36 is illustrated to show how the perimeter can help avoid transport of liquid from one layer to another. Also, in some embodiments of the present invention, the perimeter portions 36 may be adhesively attached to one another so as to seal in the lower bibulous layers. In this way, even complete saturation of the upper bibulous layer or the surrounding floor does not cause wetting of the lower bibulous layers. Also, if some or all of the bibulous layers are coated or impregnated with a cleaning solution, interconnecting the perimeters seals in the solution to avoid premature evaporation.

Figure 5:
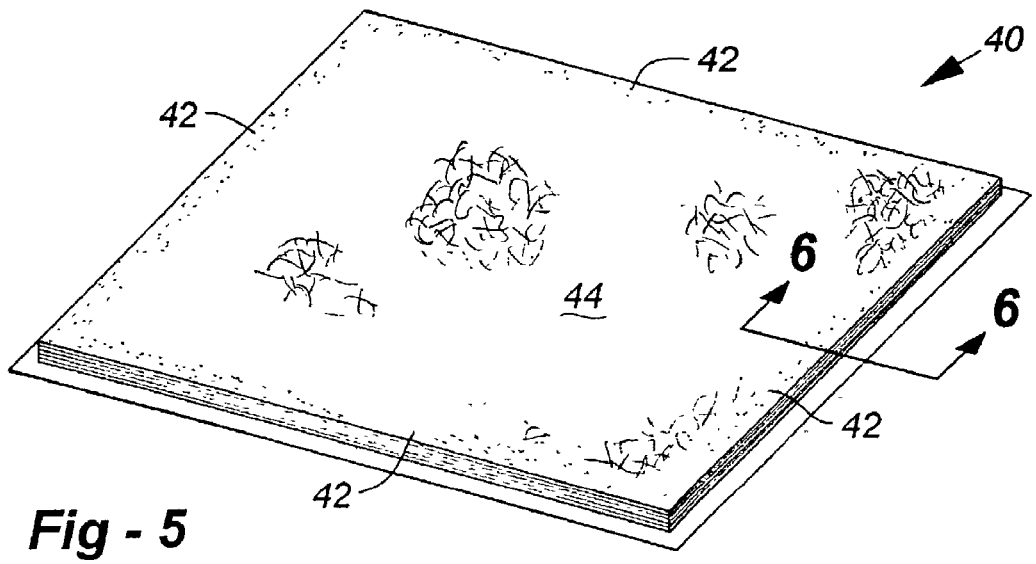
FIG. 5 is a perspective view of a third embodiment of a cleaning mat according to the present invention.
Figure 6:
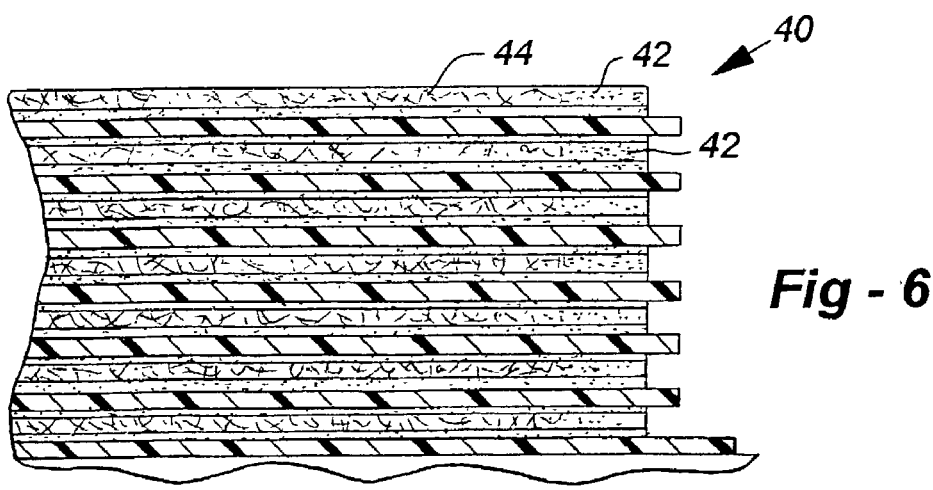
FIG. 6 is a cross-sectional view of a portion of the cleaning mat of FIG. 5 taken along lines 6—6.

Turning now to FIGS. 5 and 6, a third embodiment of a cleaning mat is generally shown at 40. This embodiment differs from the previous embodiments in that the edges 42 of each of the bibulous layers 44 are treated so as to avoid moisture transport out of the edges 42. That is, the edges 42 are treated or impregnated with a substance such as a varnish so as to eliminate the absorbency and moisture transport capability of the edges. In this way, the center portion of the bibulous layer 44 may become saturated and the edges 42 act as sides to retain this liquid in the center. As will be clear to those of skill in the art, this may be accomplished in other ways as well. For example, in a non-woven bibulous layer, the edges may be melted so as to seal the fibers to one another. Other waterproof coatings may also be applied to the edges. This approach may also provide increased strength to the edges preventing fraying or premature wear of the edges.

Figure 7:
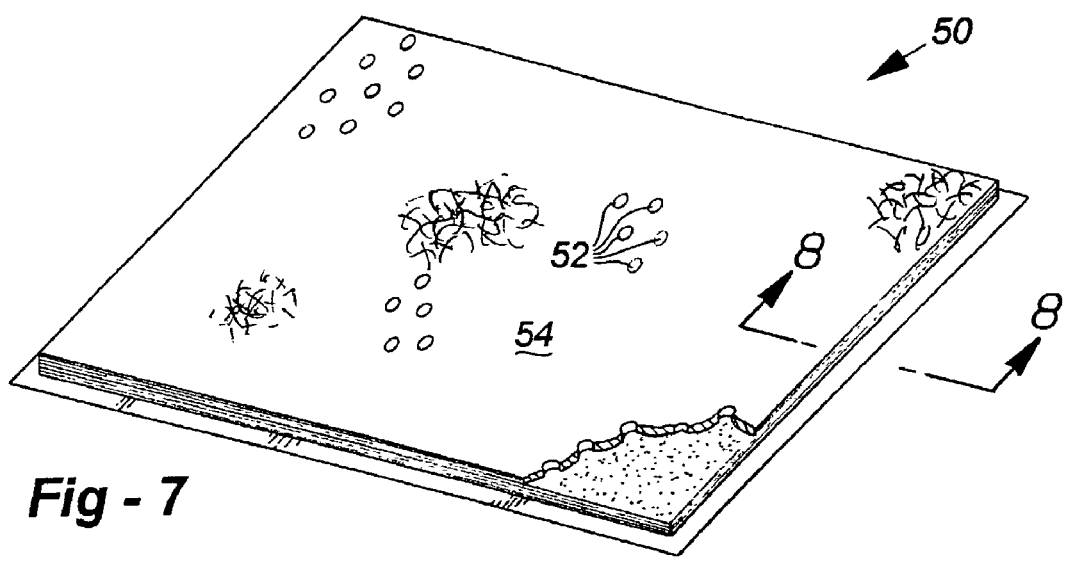
FIG. 7 is a perspective view of a fourth embodiment of a cleaning mat according to the present invention.
Figure 8:
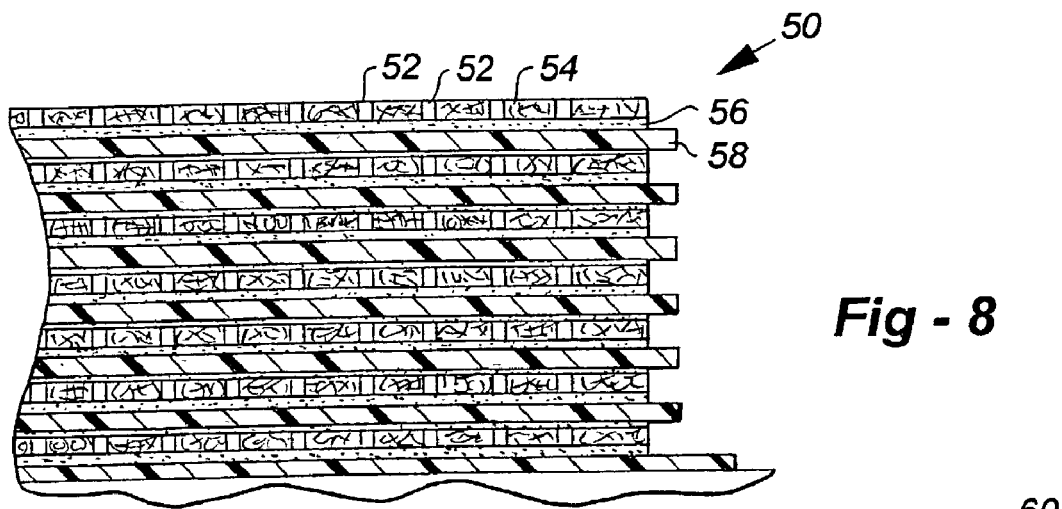
FIG. 8 is a cross-sectional view of a portion of the cleaning mat of FIG. 7 taken along lines 8—8.

Turning now to FIGS. 7 and 8, a fourth embodiment of a cleaning mat according to the present invention is generally shown at 50. For some applications, it is desirable to provide a version of the cleaning mat that is able to retain more dirt and debris. The embodiment 50 of FIGS. 7 and 8 differs from the previous embodiments in that a plurality of perforations 52 are provided through the bibulous layer 54. Though shown only in a few places in FIG. 7, the perforations preferably are provided in all areas of the bibulous layer 54. Alternatively, the edges may not be perforated. As best shown in FIG. 8, the perforations 52 pass entirely through the bibulous layer 54 to the adhesive 56 interconnecting the moisture barrier layer 58 with the bibulous layer 54. Therefore, each of the perforations acts like a little dish or cup with adhesive in the bottom of the cup. Therefore, when someone wipes their feet on the cleaning mat 50, the perforations not only help to catch dirt and debris by providing a rougher upper surface, but also provide "traps" for the dirt and debris. Dirt and debris which falls into the perforations 52 is retained therein by the adhesive 56 in the bottom of the perforations. The upper surface of the bibulous layer 54 may be pattern coated with adhesive, as previously discussed. Together, this makes a highly effective cleaning mat. Obviously, the perforations 52 may be left less deep so that they do not pass all the way to the adhesive 56. This retains the benefit of providing recesses wherein dirt and debris may be captured and providing a rougher upper surface, but does not adhesively retain the dirt and debris in the perforations 52. Alternatively, these less deep perforations could be adhesively coated as part of the pattern coating process so that the perforations do not need to pass entirely through the bibulous layer 54. In the embodiment of the present invention wherein the bibulous layer and the moisture barrier layer are heat bonded together, no adhesive exists at the lower edge of the bibulous layer. In this situation, the perforations lack adhesive bottoms, or adhesive may be added. As a further alternative, the bibulous layer may have two sublayers. The upper sublayer consists of a net or gauze that is relatively open and coated with a tackifier or adhesive. A lower sublayer is solid and absorbent. This provides a similar effect to pattern coating because the upper sublayer is relatively open so that moisture can still reach the lower absorbent layer. It also provides a somewhat rougher upper surface and areas to trap dirt and debris.

Figure 9:
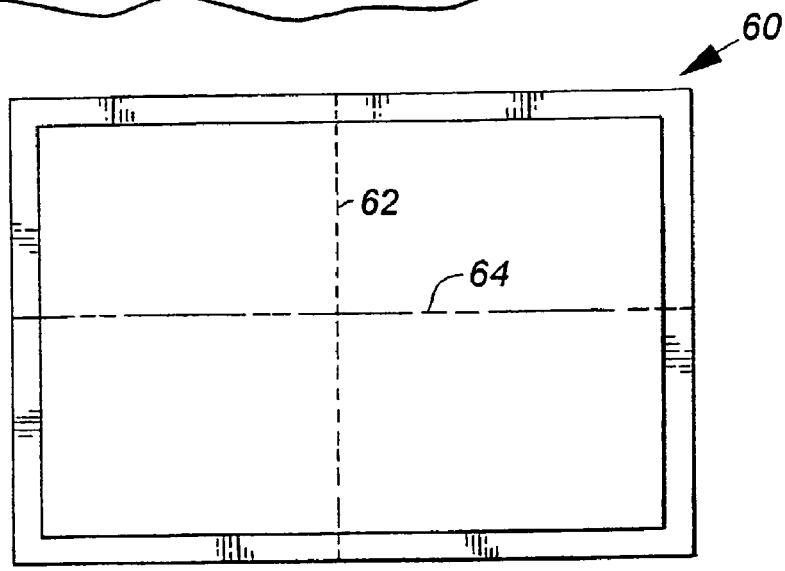
FIG. 9 is a top plan view showing a perforation or serration approach for a cleaning mat according to the present invention to encourage folding the mat.

Turning now to FIG. 9, a top view of a mat 60, which may be used with any embodiment of the present invention, is shown having a pair of lines bisecting the mat 60 both top to bottom and side to side. Obviously, for some applications, the various mats of the present invention may be large in size. For merchandising purposes, it is preferable that the mat be packageable in a package smaller than the dimensions of the mat. For this purpose, it is desirable to fold the mat. This may be accomplished in several ways. The backing sheet and/or the cleaning sheets may be serrated or completely cut along one of the two lines 62 and 64 shown in FIG. 9. This gives a "relief" along which folding may occur. Also, in the vicinity of the folding area, the pattern coating adhesive may be left off to avoid gluing of the two sides of the fold to one another. Also, a release layer may be provided prior to folding so that the tacky surfaces do not come into contact. In use, the mat 60 would be unfolded and the release layer removed. Where the sheets or the backing sheet are rigid, a score line is particularly preferable because it allows folding.

Figure 10:
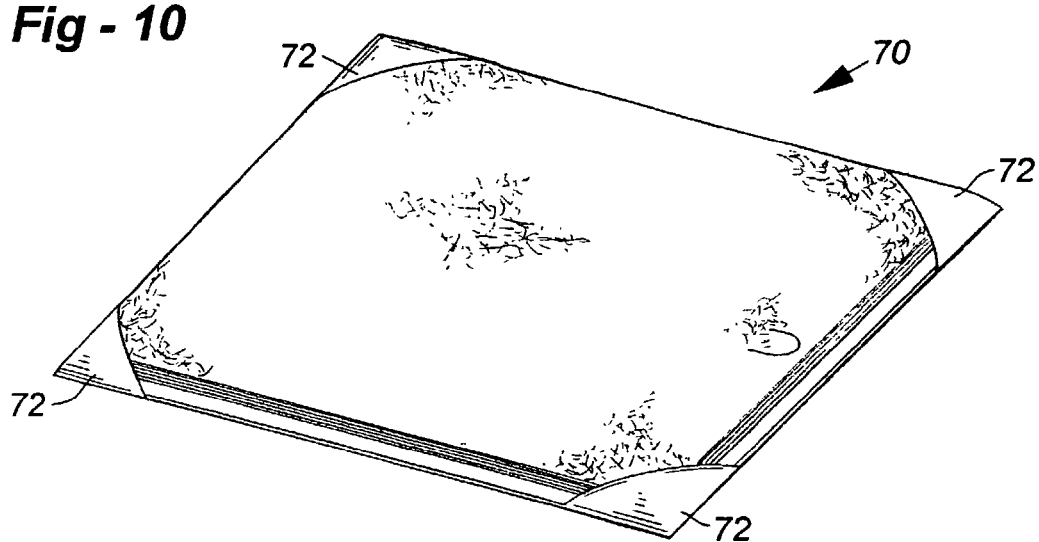
FIG. 10 is a perspective view of a fifth embodiment of a cleaning mat according to the present invention.

Referring now to FIG. 10, a fifth embodiment of the present invention is generally shown at 70. This cleaning mat 70 is similar to the previous embodiments except that instead of adhesive holding the plurality of cleaning sheets in a stacked configuration, four corner tabs 72 are provided at the corners of the backing sheet. Then, the corners of the cleaning sheets may be tucked under these tabs so that they are retained in their stacked configuration. This also provides ease of refill. This operates similar to some desktop calendars which have a cardboard backing sheet and corner pockets into which calendar sheets are tucked for use. As an alternative, the pockets or tabs may extend completely along two or more edges of the backing sheet.

Figure 11:
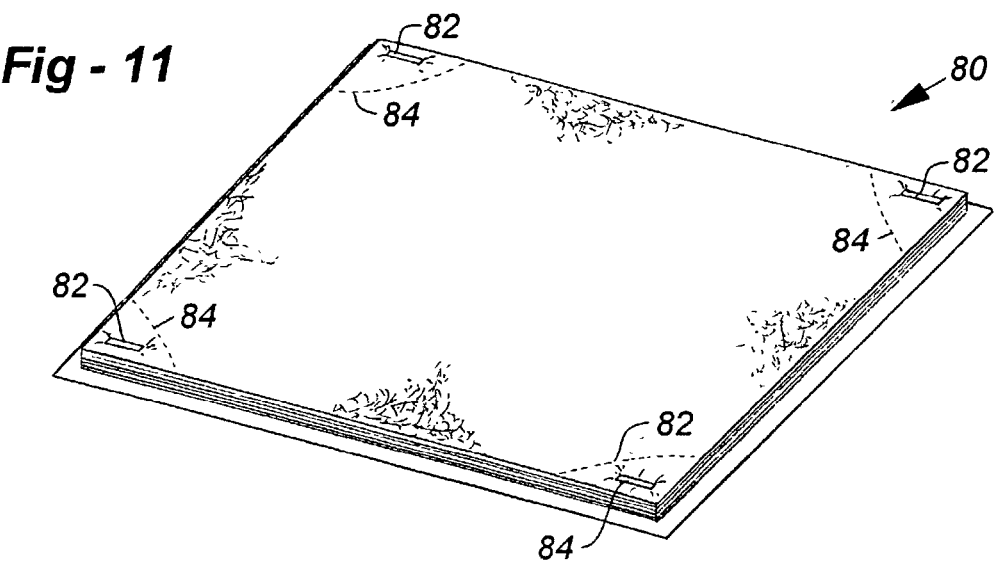
FIG. 11 is a perspective view of a sixth embodiment of a cleaning mat according to the present invention.

FIG. 11 shows yet another approach to maintaining the cleaning sheets in a stacked configuration without the need for adhesive between the individual sheets. In this embodiment of the cleaning mat 80, staples 82 are used to interconnect the cleaning sheets in their stacked configuration. When an uppermost cleaning sheet becomes soiled, it is torn from the staples to expose the next lower sheet. Pieces of cardboard or other stiff material may be used at the corners to strengthen the staple connections. The approaches of FIGS. 10 and 11 may be altered in a variety of ways without departing from the scope of the invention. For example, the corner tabs or pockets may be combined with the staples. In this case, a staple in each corner may be covered by a corner pocket so as to hide the staple. The sheets would first be stapled together and then the corner pocket placed over each corner to hide the staples. The pocket could be held in place in a variety of ways including hot melt glue. Alternatively, the corner pockets may be placed over the corners and then a staple placed through the pockets and the sheets. A label or cover may be placed over the top of the staple to hide it. Also, a double adhesive strip may cover the bottom of the staple to cover it, protect the floor, and hold the mat in place. These same approaches may be applied where edge strips are used in place of corner pockets. As yet another alternative, perforations, as shown at 84 in FIG. 11, may be placed at the corners adjacent the staples to ease removal of soiled sheets. Corner pockets may then cover the staples and the perforations. Also, some adhesive may be placed between the sheets on the embodiments of FIGS. 10 and 11 to assist the staples and/or pockets in stabilizing the stack. As a further alternative with any embodiment of the present invention, the base sheet may define a "frame" for the removable sheets. For example, it may have sloped edges and a recessed center portion wherein the individual sheets may rest.

As discussed with the various embodiments, a backing sheet or base sheet is preferably provided which contacts the floor. It is preferred that the cleaning mat stay in one place during use. For this purpose, the base sheet may be provided with adhesive on its underside so as to retain it in contact and in position on the floor. Alternatively, the backside of the base sheet may be coated with an anti-slip substance such as rubber. The base sheet may be any of a variety of materials such as a heavier cardboard or plastic. Also, the base sheet may merely be an identical or differently sized cleaning sheet as the remaining sheets in the stack. Adhesive on the backside of the base sheet may be protected by a release layer which is removed prior to placing the mat on the floor. Adhesive strips may also be applied to the bottom sheet in one or more spots. A release layer may cover these spots and be removed when the mat is put into place.

The bibulous layers may be modified in various ways depending on the application of the cleaning mat. For example, a scrim or mesh may be included in the construction of the bibulous layer to add strength to the bibulous layer. The scrim can be incorporated so as to slightly pucker the upper surface of the bibulous layer to improve the wiping ability of the upper surface. Also, the present invention has applications other than as a cleaning mat. For example, the mat may be modified so as to be a pet mat whereon a pet such as a dog or cat may rest or sleep. It may also serve as a puppy-training pad. For this purpose, the mat may have a very low tack adhesive to retain pet hair deposited by the pet. Also, the bibulous layer may be treated with an attractant to make the mat attractive to the pet. Further, solutions such as cleaning solutions or anti-flea preparations may be added to the pet mat as needed.

Turning now to FIGS. 13–16, a sixth embodiment of a cleaning mat system according to the present invention will be described. In this embodiment, the base is reusable and receives a removable and disposable cleaning sheet. The base and the cleaning sheet may both take more than one form, according to the present invention.

Figure 13:
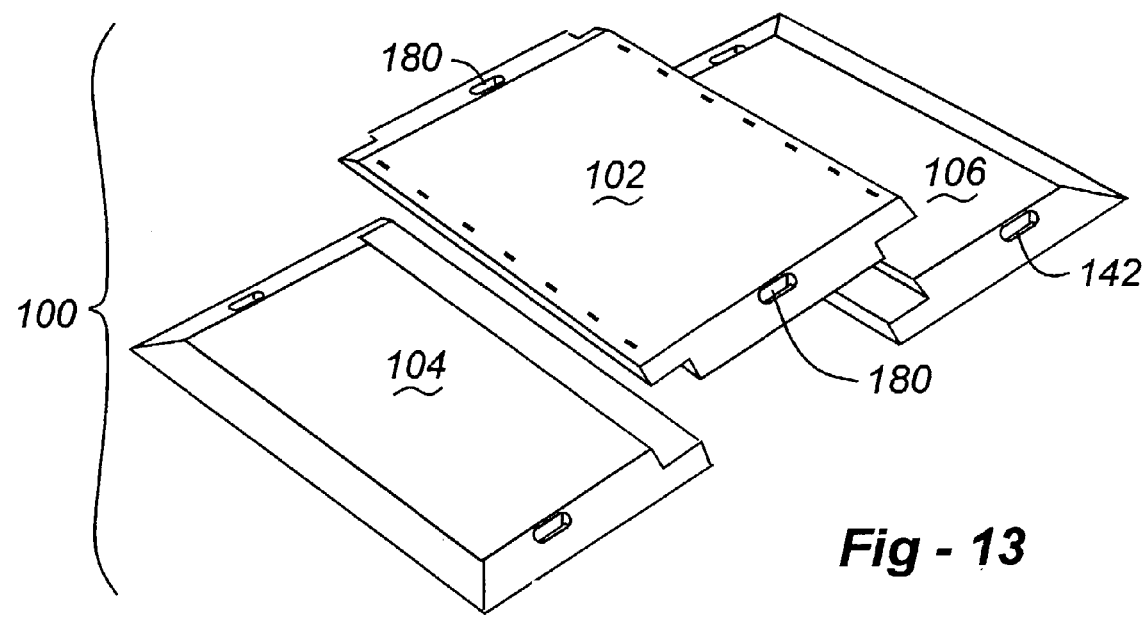
FIG. 13 is a perspective view of a three piece base for use with a sixth embodiment of a cleaning mat system according to the present invention, with the pieces separated.
Figure 14:
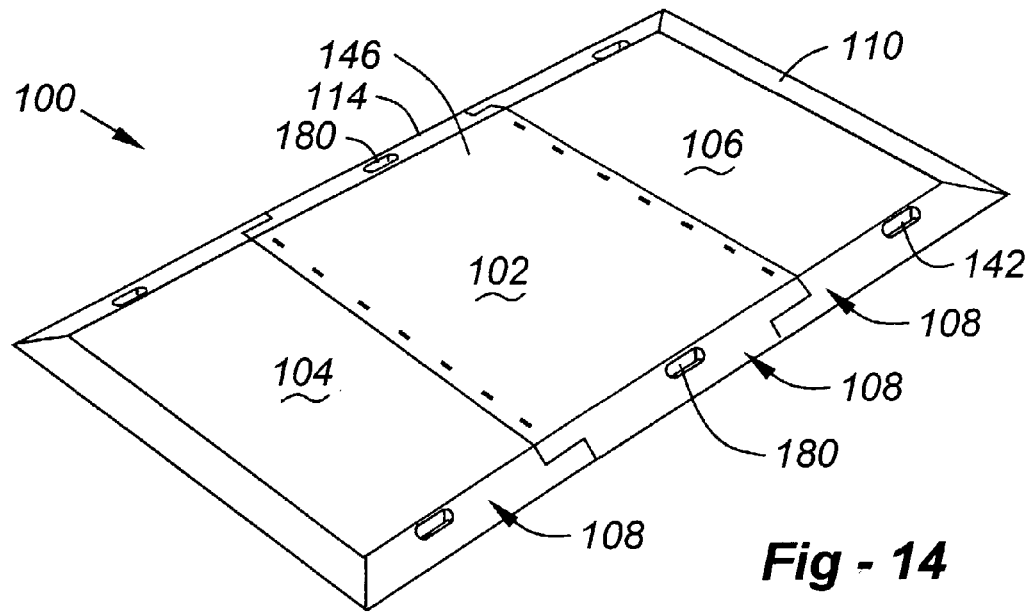
FIG. 14 is perspective view of the base of FIG. 13, with the three pieces assembled to form a single base.

FIGS. 13 and 14 show perspective views of the base 100 of the cleaning mat system according to this embodiment. The base 100 may come in several sizes, as is typical for floor mats. For example, for home use, the base may have dimensions of approximately 20 inches by 30 inches. Larger or smaller mats may be used for other applications. For example, in commercial settings, a much larger base may be desirable. As is known to those of skill in the art, a base 100 with dimensions sufficiently large to function as a typical floor mat, may be difficult to ship and store due to dimensional constraints. For example, retail outlets often restrict shelf space available to a single product to a size less than a typical floor mat. According to the present invention, the mat 100 preferably is provided in multiple sections, so that the base 100 can be shipped and stored more compactly. In FIG. 13, the base 100 is shown as having three pieces, a middle section 102, and a pair of end sections 104 and 106. The three sections 102–106 may be interconnected in any of a variety of ways. For example, they may interlock like puzzle pieces, may use interlocking tabs, or may glue or Velcro together. Any other approach to interconnecting the sections may be used with the present invention. FIG. 14 shows the three sections 102–106 interconnected to form a single base 100. Alternatively, the base 100 may be provided as a single piece, in two sections, or in four or more sections. As shown, each of the sections 102–106 preferably has a tapered edge 108 so that the assembled base 100 has a tapered edge 108 around its entire perimeter. The mat 100 may be said to have a perimeter edge 110 which defines the perimeter of the base 100 and is tapered on all sides so as to reduce catching on objects and to make it easier for wheeled objects to roll over the base 100. The perimeter edge 110 may be said to include a leading edge 112 and an opposed trailing edge 114.

Figure 20:
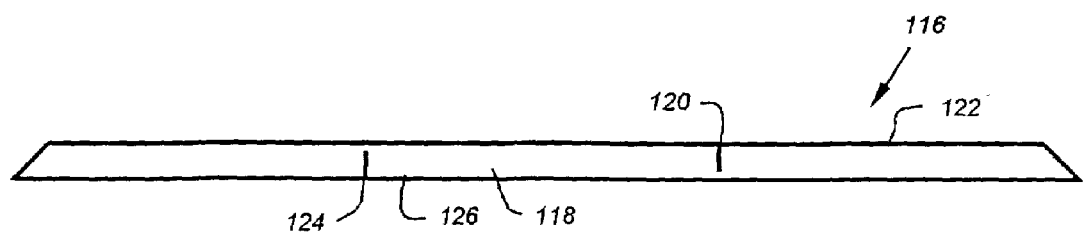
FIG. 20 is a side elevational view of an alternative embodiment of the base designed for folding.
Figure 21:
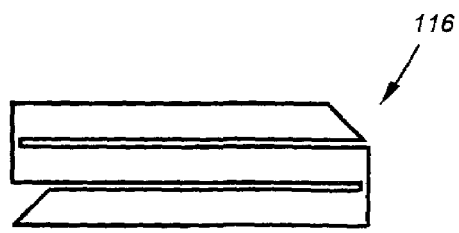
FIG. 21 is a side view of the base of FIG. 20, with the base folded for storage or shipping.

Other alternatives are also available for allowing the base of the cleaning mat system to be shipped, stored, and displayed for retail sale. As one preferred alternative, the base may be provided as a single piece, formed of a material which may be rolled either side-to-side or end-to-end so as to require less dimensional shelf space. FIGS. 20 and 21 show another preferred alternative. In this embodiment, the base 116 is shown as viewed from the leading edge 118. The base 116 is one piece, but has a slit 120 defined in the upper surface 122 of the base 116, running from the leading edge 118 to the trailing edge. This allows the base 116 to be folded at the slit 120. Another slit 124 is provided in the lower surface 126, for folding. The slits 120 and 124 divide the base into approximate thirds. FIG. 21 shows the base 116 folded at the slits. This reduces the dimensional space requirements for the base 116 in a manner similar to the three-piece base of FIGS. 13 and 14, but reduces assembly requirements for the user. As will be clear to those of skill in the art, additional slits may be provided, or the slits may be provided in differing arrangements to suit particular folding requirements. As a further alternative, the base may be provided in multiple sections, with additional sections interconnected so as to increase the size of the base.

The base for use with the present invention may be formed of a variety of materials, such as plastics or rubber. It is preferred that the base be substantial enough and heavy enough to generally maintain its position in an entryway or other position of use. Some flexibility and resiliency is also preferred, such that the base will conform to a surface that is not completely level or flat.

Figure 15:
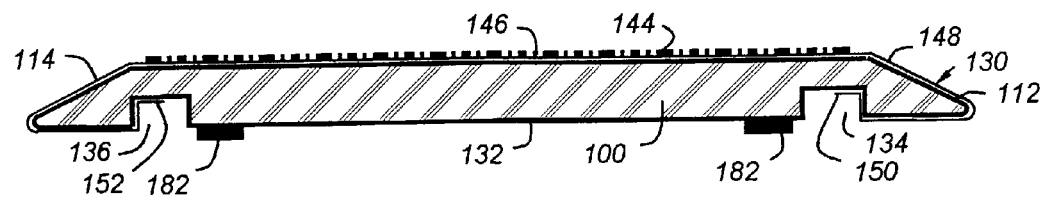
FIG. 15 is an end view of the base of FIGS. 13 and 14, with a cleaning sheet disposed on the base.
Figure 16:
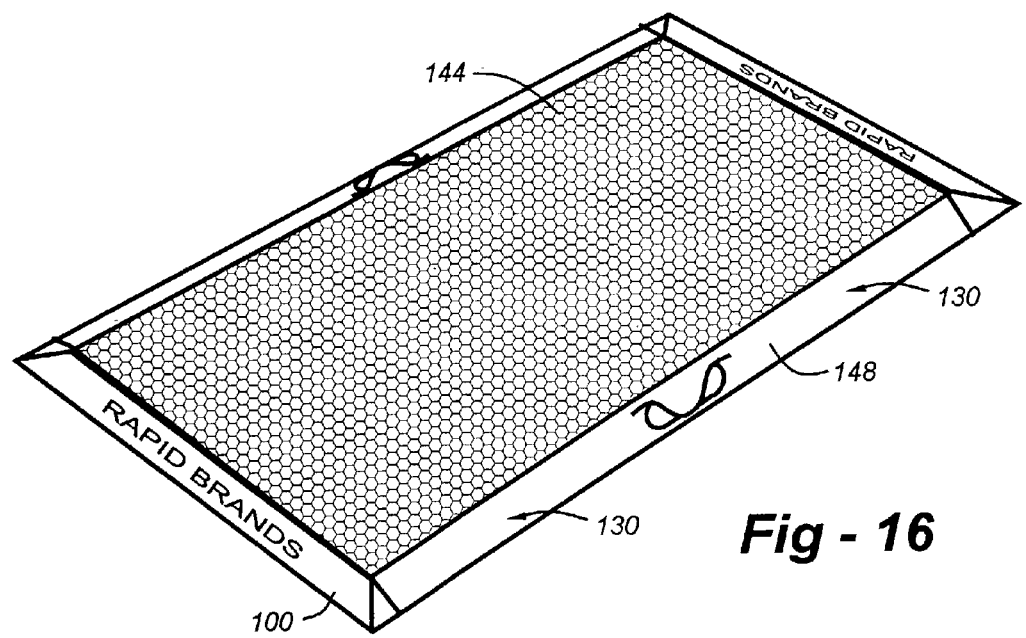
FIG. 16 is a perspective view of a base with a cleaning sheet disposed thereon.

Referring now to FIGS. 15 and 16, the base 100 is shown with a cleaning sheet 130 disposed thereon. It should be understood that any version of the base may be used. Most embodiments of the base 100 preferably include gripping members defined in the lower surface 132. These gripping members are shown as recesses in FIG. 15, and generally indicated as 134 and 136. These gripping members 134 and 136 may take several forms, and are designed to grip the edges of the cleaning sheet 130. One preferred embodiment is shown in FIG. 18A, which shows the underside 132 of the base 100. A preferred embodiment of the gripping members is shown at 134, 136, 138, and 140. These gripping members 134–140 are designed to have an edge of a cleaning sheet tucked therein, or may have a slit in a cleaning sheet positioned over a tab that forms part of each of the gripping members 134–140. Further discussion of this type of gripping member, is provided in applicant's pending U.S. patent application Ser. No. 09/602,189, filed Jun. 12, 2000 U.S. Pat. No. 6,405,403, and co-pending U.S. patent application Ser. No. 09/993,137, filed Nov. 16, 2001 U.S. Pat. No. 6,810,554, the entire contents of which are incorporated herein by reference.

These incorporated disclosures are directed to cleaning tools, including mops and mitts. Any of the technology disclosed in these disclosures may be used with the present cleaning mat system according to the present invention. For example, these disclosures provide information about various embodiments of cleaning sheets, moisture barrier layers, treatments, assembly techniques, and methods of interconnecting cleaning sheets with tools. Any of these aspects may be applied to the present invention.

As shown in FIG. 18, the gripping members 134–140 are preferably provided as four gripping members, with two being provided adjacent the leading edge 112 and two adjacent the trailing edge 114. They are preferably outboard close to the corners so as to grip the cleaning sheet near its corners. Additional gripping members may be provided, or fewer. Also, other configurations of gripping members may be used. Referring again to FIGS. 13 and 14, it may be seen that openings, such as 142 are visible from the upper side of the base 100. These openings are part of the formation of one embodiment of the gripping members and could allow the cleaning sheets to be tucked in from the top side or the bottom side.

The cleaning sheet 130 in FIG. 15 may take multiple forms, including any discussed in this specification, as well as in the incorporated specifications. For example, the cleaning sheet may be textured, as discussed earlier. In the illustrated embodiment, the cleaning sheet 130 is a two layer cleaning sheet, with a fabric upper layer 144 that generally covers the upper surface 146 of the base 100, and a strengthening/reinforcement layer 148 which extends beyond the sides of the upper fabric layer 144, wraps around the leading and trailing edges, and interconnects with the gripping members 134 and 136, as well as gripping members not shown. The cleaning sheet 130 may be said to have a pair of spaced apart side edges 150 and 152, with these side edges 150 and 152 engaging the gripping members.

The upper fabric layer 144 may be a woven or non-woven material suitable for cleaning objects which contact the cleaning mat system. While referred to as a fabric, this term is used herein to indicate any material, including paper-based, fiber-based, man made and synthetic materials, which are suitable for cleaning, and is not limited to cloth or cloth-like materials. In some embodiments, the fabric layer 144 is bibulous, in that it absorbs water. However, it may also be hydrophobic, or not particularly absorbent. As another alternative, additional materials may be added to the fabric layer, to enhance its absorptive characteristics. For example, a moisture absorbing material may be added to the fabric layer or disposed between the fabric layer and the strengthening layer 148. The fabric layer may also be treated with a cleaning solution, an antibiotic solution, or other materials as discussed herein and in the incorporated specifications. The surface may be treated with a tackifier, a disinfectant, an anti-microbial, a fragrance, a cleaner, or other substances, and/or be water activated. If a tackifier is used, all or a portion of the surface may be treated, or pattern coating may be used so as to provide tackiness while retaining absorptive capabilities.

The strengthening layer 148 supports and reinforces the fabric layer 144 and may be a plastic material, or other materials discussed in the present specification, as well as in the incorporated specifications. The strengthening layer 148 may serve as a moisture barrier layer. As an alternative to the illustrated embodiment, the fabric layer 144 and strengthening layer 148 may be co-extensive, such that both the layers engage the gripping members. Alternatively, the fabric layer may extend over more or less of the strengthening layer 148 than in the illustrated embodiment.

The base 100 preferably has an upper surface 146 that is not recessed with respect to the perimeter edges, though the upper surface can be somewhat recessed with respect to the edges for particular applications. Also, while the upper surface 146 is shown as flat or smooth in some of the figures, the upper surface may be textured so as to function as a traditional mat when the cleaning sheet is not in place. Also, some texturing may enhance retention and stability of the cleaning sheet.

Referring now to FIGS. 18A–18C, installation of the cleaning sheet will be discussed. FIG. 18A shows the base 100 without a cleaning sheet installed, with the lower surface 132 shown. In 18B, a cleaning sheet 130 has been positioned adjacent the upper surface of the base 100 with the side edges 150 and 152 partially wrapped about the base 100. The illustrated version of the cleaning sheet 130 is shown having four slits 154 near the side edges 150 and 152 and positioned in alignment with the gripping members 134–140. One of the slits is shown engaging gripping member 140. FIG. 18C shows the cleaning sheet 130 completely engaged with the base 100. For purposes of the present invention, the slits engaging the gripping members falls within the definition of the side edges engaging the gripping members. In other words, "side edges" include the slits and the portions of the cleaning sheet near the absolute edges.

Figure 17A:
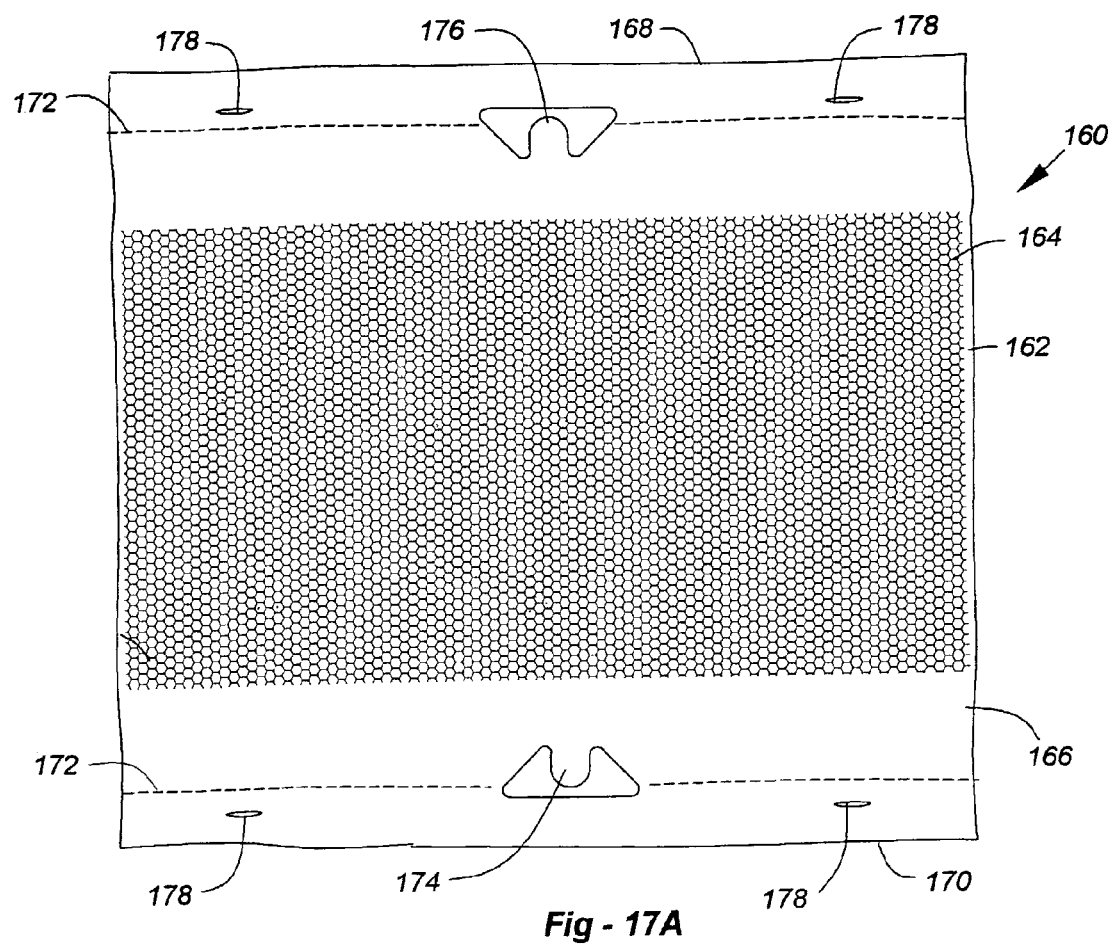
FIG. 17A is a plan view of one embodiment of a stack of cleaning sheets.
Figure 17B:
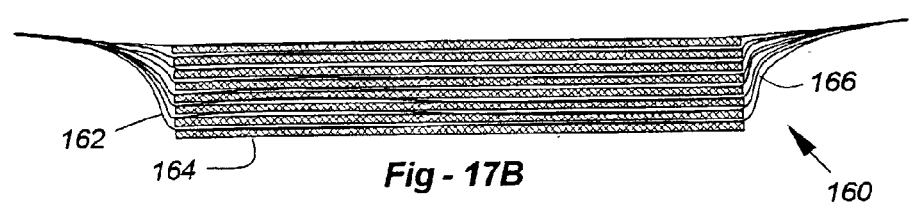
FIG. 17B is a end view of the stack of cleaning sheets in FIG. 17A.

Referring now to FIGS. 17A–17D, alternative embodiments of cleaning sheets will be discussed. In the embodiment of FIG. 15, the cleaning sheet 130 was a single sheet. Once the sheet becomes soiled, the user detaches the side edges from the gripping members and replaces the cleaning sheet with a replacement cleaning sheet. As another alternative, the cleaning sheet 130 may have an additional fabric layer on the underside of the strengthening layer 148 so that the cleaning sheet may be "flipped over" and reused. However, in either case, the cleaning sheet 130 is removed in its entirety once it is soiled. In the embodiment of FIGS. 17A and 17B, a plurality of individually removable and disposable cleaning sheets is provided in a stacked configuration 160. The stacked configuration 160 consists of a plurality of individual cleaning sheets 162, with each cleaning sheet 162 preferably constructed similar to the cleaning sheet 130 of FIG. 15. That is, each cleaning sheet 162 has an upper fabric layer 164 and a lower reinforcement layer 166. In the embodiment of FIGS. 17A and 17B, the fabric layer 164 is provided only on the central portion of the stacked configuration 160, with the reinforcement layer 166 extending beyond the fabric layer so as to define a perimeter adjacent the spaced apart side edges 168 and 170. Preferably, the perimeters or margins of the reinforcement layers 166 are joined together, as best shown in FIG. 17B. This seals in the unexposed fabric layers to prevent them from becoming soiled.

As shown in FIG. 17A, perforations 172 are preferably provided intermediate the side edges 168 and 170 and the edges of the fabric layer 164. The perforations 172 allow an outermost soiled cleaning sheet to be removed from the stacked configuration and disposed. As an alternative to perforations, the cleaning sheets may be scored or weakened so as to define a separable area. Gripping tabs 174 and/or 176 may be provided at one or both sides so as to allow a soiled sheet to be gripped and removed. The stacked configuration 160 may have slits 178 provided adjacent the edges 168 and 170 so that the stacked configuration may be interconnected with the base, as was shown in FIGS. 18B and 18C. Alternatively, the side edges may be tucked into other types of gripping members. In one preferred embodiment, five to ten cleaning sheets form the stacked configuration. Referring again to FIGS. 13 and 14, a protrusion 180 may be provided on the leading and trailing side edges of the base so as to be aligned with the tabs 174 and 176 on the stacked configuration 160 of cleaning sheets. This protrusion lifts the tabs upwardly somewhat so they may be more easily gripped. FIG. 16 shows a protrusion with a tab on top of it.

Referring now to FIG. 15, the base 100 may have feet 182 provided on the lower surface 132. The feet 182 are provided in some embodiments, and preferably are compressed such that the feet 182 are compressed and the lower surface 132 of the base 100 is pressed against the floor or the support surface when a sufficiently heavy object is placed on top of the cleaning mat system. This causes the portions of the cleaning sheet 130 that wrap around the leading edge 112 and the trailing edge 114 to be held against the floor, so as to be stabilized. However, when the weight is removed from the base 100, the feet 182 preferably lift the base slightly upwardly so that the cleaning sheet 130 may more easily be removed.

In the embodiment of the present invention wherein a stacked configuration of cleaning sheets is used, the perforations 172 are preferably positioned underneath the leading and trailing edges 112 and 114 so that the perforations are somewhat weighted during use. However, in the embodiments that provide the feet 182, the base lifts upward somewhat when the weight is removed. The tab 174 and/or 176 may be gripped so as to tear the outermost cleaning sheet away at the perforations 172, which now are not weighted by the base 100. Preferably, the user grabs both tabs 174 and 176 and pulls them away so that the cleaning sheet folds upwardly and traps any dirt on the cleaning sheet. The feet 182 are shown as individual little pads, such as shown on the lower surface 132 in FIG. 18A. However, the feet may be continuous strips, or tubes that run side-to-side or front-to-back. They may be formed of foam, rubber, or plastic, or other materials suitable to the application. It is also preferred that the feet help to prevent slipping of the base 100. For this purpose, the feet, or lower surface of the base 100 may be tacky or otherwise grip the support surface on which the cleaning mat system in placed. Suction cups may also be provided on the lower surface or on the feet. As yet another possibility, one-half of a section of hook and loop fastener material may be attached to the support surface, with the complementary half attached to the underside of the base 100, so that the base may be interconnected with the floor, and removed as necessary.

Figure 17C:
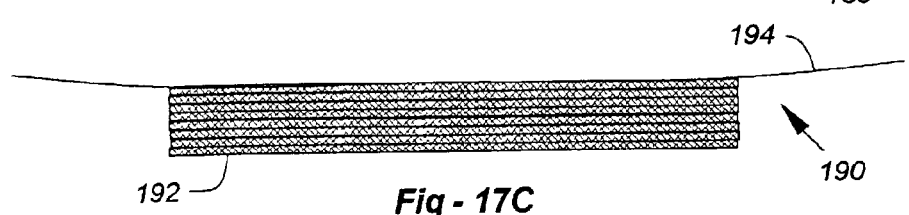
FIG. 17C is an end view of an alternative embodiment of a stack of cleaning sheets, with a base sheet.

Referring now to FIG. 17C, an alternative embodiment of a stacked configuration of cleaning sheets 190 is shown. The stacked configuration 190 includes a plurality of cleaning sheets 192 and a backing sheet 194. As shown, the backing sheet 194 preferably extends beyond the edges of the stack of cleaning sheets 192. The backing sheet 194 is then the portion of the stack configuration that engages the gripping members on the base. In this version, the individual cleaning sheets 192 may be single layers of fabric, or may each have double layers, such as a fabric layer and a reinforcement layer. In this version, the individual cleaning sheets are preferably retained in the stacked configuration by adhesive, but may be retained in the stacked configuration in other ways discussed in the present specification or in the incorporated specifications. The single sheet embodiment of FIG. 15 may also consist of a single fabric layer, without a second strengthening layer. Also, a single fabric layer, or multiple fabric layers, may have a reinforcement internal thereto, such as a scrim.

Figure 17D:
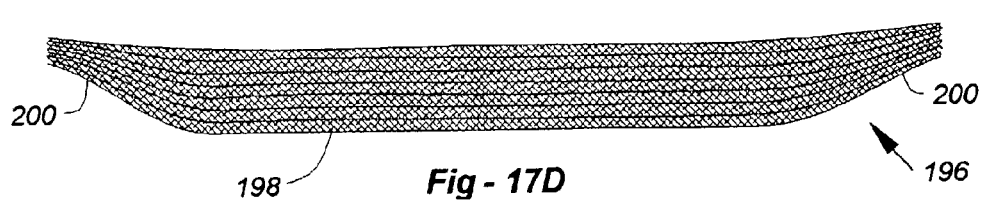
FIG. 17D is a end view of another alternative embodiment of a stack of cleaning sheets.

Referring now to FIG. 17D, another alternative embodiment of a stacked configuration 196 is shown. This configuration consists of a plurality of cleaning sheets 198, with each cleaning sheet being coextensive to the side edges and the portion near the edges being compressed to form in the margin areas 200. For example, if non-woven material is used as the cleaning layers, the non-woven material may be compressed and heated so as to form a substantially thinner edge area which may be gripped by the gripping members. The individual cleaning sheets may consist of a single fabric layer, a reinforced fabric layer, a fabric layer plus a reinforcement layer, or a fabric layer that is coated so as to prevent moisture transport from one layer to the next cleaning sheet. Other embodiments where a single-layer fabric cleaning sheet is used may also have a coating so as to prevent the transport of moisture from one sheet to another.

Figure 19:
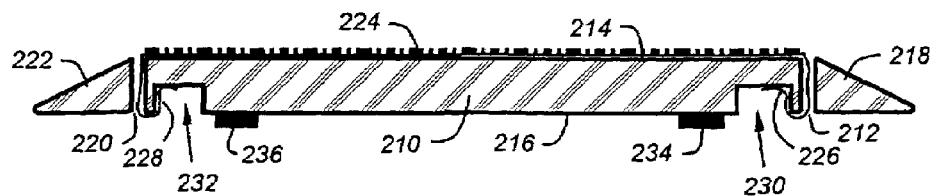
FIG. 19 is an end view of an alternative embodiment of a base, including a slot therethrough for passage of the cleaning sheet, with the cleaning sheet shown installed thereon.

Referring now to FIG. 19, an alternative embodiment of a base 210 will be described. In this embodiment, the base 210 has a first slot 212 defined through the base from the upper surface 214 to the lower surface 216 adjacent the leading edge 218. A second slot 220 is defined from the upper surface 214 to the lower surface 216 adjacent the trailing edge 222. The slot preferably extends most of the width of the base. A cleaning sheet 224 is then disposed on the base 210 with its side edges 226 and 228 passing through the slots 212 and 220, respectively, and engaging gripping members 230 and 232, respectively. Feet 234 and 236 may be optionally provided inboard of the gripping members 230 and 232. In the embodiment of FIG. 19, the cleaning sheet 224 does not have to wrap around the leading edge 218 and trailing edge 222. This somewhat reduces the required size of the cleaning sheet 224. Also, it can provide a neater and more durable appearance, since the cleaning sheet is not exposed at the leading and trailing edges. As an alternative, the slots 212 and 220 may serve as the gripping members, with the edges of the cleaning sheet tucked into the slots and the slots then gripping the edges of the cleaning sheet. The embodiment of FIG. 19 may also be used with any of the embodiments wherein multiple cleaning sheets are provided in a stacked configuration. As a further alternative, the base may be constructed like some sandpaper holders, wherein the edges are separable with the edge of the sandpaper pushed into the separated edges, and then the edges are released so as to grip the sandpaper. In some embodiments, gripping teeth are provided in the separable edges.

Figure 22:
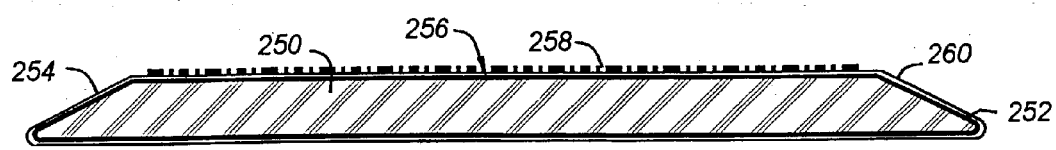
FIG. 22 is an end view of an alternative embodiment of a base and cleaning sheet, with the cleaning sheet taking the form of a cleaning sleeve wrapped about the base.
Figure 23:
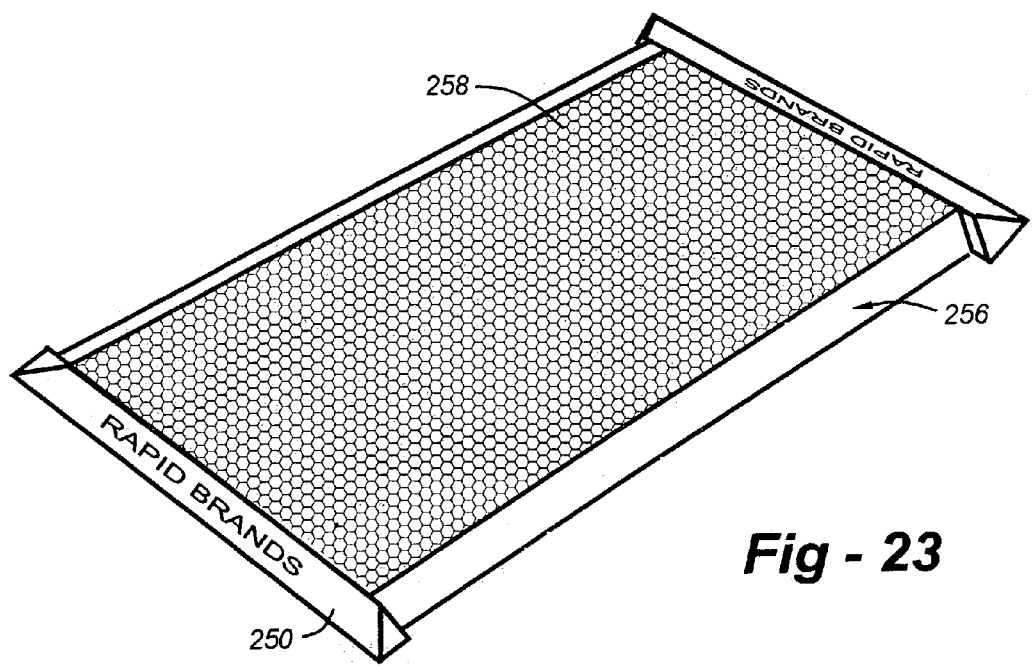
FIG. 23 is a perspective view of the base and cleaning sheet of FIG. 22.

Referring now to FIGS. 22 and 23, yet another embodiment of a cleaning mat system according to the present invention will be discussed. In this embodiment, a base 250 is provided, which has a similar cross-sectional shape to the previously discussed bases. However, the base 250 preferably does not have gripping members or feet. Instead, it is tapered to a leading edge 252 and trailing edge 254. In this embodiment, a cleaning sheet is provided as a cleaning sleeve 256. The sleeve 256 wraps completely around the base 250 so that the base 250 is substantially contained within the sleeve. Put another way, the sleeve 256 may be said to have an opening therein, with the base 250 received in the opening. The sleeve 256 may be a loop with two open ends, or may be closed at one end. The embodiment with two open ends is shown in FIG. 23. Here, the base 250 is shown with the sleeve 256 wrapped around it. The base 250 extends out of each end of the sleeve 256. Any embodiment of cleaning sheet discussed herein may be used with this base, with the cleaning sheet, or stacked configuration of cleaning sheets being modified such that it forms a loop or sleeve. In the illustrated embodiment, the sleeve 256 has a fabric upper lay 258 that covers just the upper surface of the base 250, and a reinforcement layer 260 that extends around and wraps around the leading and trailing edges 252 and 254, and covers the lower surface of the base 250. Alternatively, the fabric layer 258 and reinforcement layer 260 may be coextensive, or the cleaning sleeve may be a single fabric layer. In these embodiments, the sleeve can be partially rotated about the base as portions become soiled so as to expose new unsoiled portions. Embodiments may also be provided with multiple removable cleaning sheets, with a base sheet or a portion of all sheets forming the portion that wraps around the base. In some embodiments, the base 250 is reshaped to enhance its function with this embodiment. As shown in FIG. 23, the base 250 is slightly widened at its two ends so that the sleeve 256 does not easily slide off of the base 250. The widened portions of the base may be flexible so as to be flexed out of the way when the sleeve is placed thereon. Alternatively, the entire base may be folded into a U-shape with the sleeve slipped over, and then the base released so as to completely fill the sleeve. It may be a slightly loose or somewhat tight fit, but it is preferred that there is little or no relative movement between the sleeve and the base so as to prevent slipping.

As discussed above, the base that forms part of the present invention may be constructed in a wide variety of ways. It is preferred that the base be foldable or rollable to reduce shipping and storage size, and it is preferred for some embodiments that the base have feet to lift it upwardly to allow release of the cleaning sheets when a person is not standing on the mat. FIGS. 24–27 illustrate further variations on the design of the underside of the base. These design alterations may be used with any of the previous embodiments and may be combined with any of the previous features.

Figure 24:
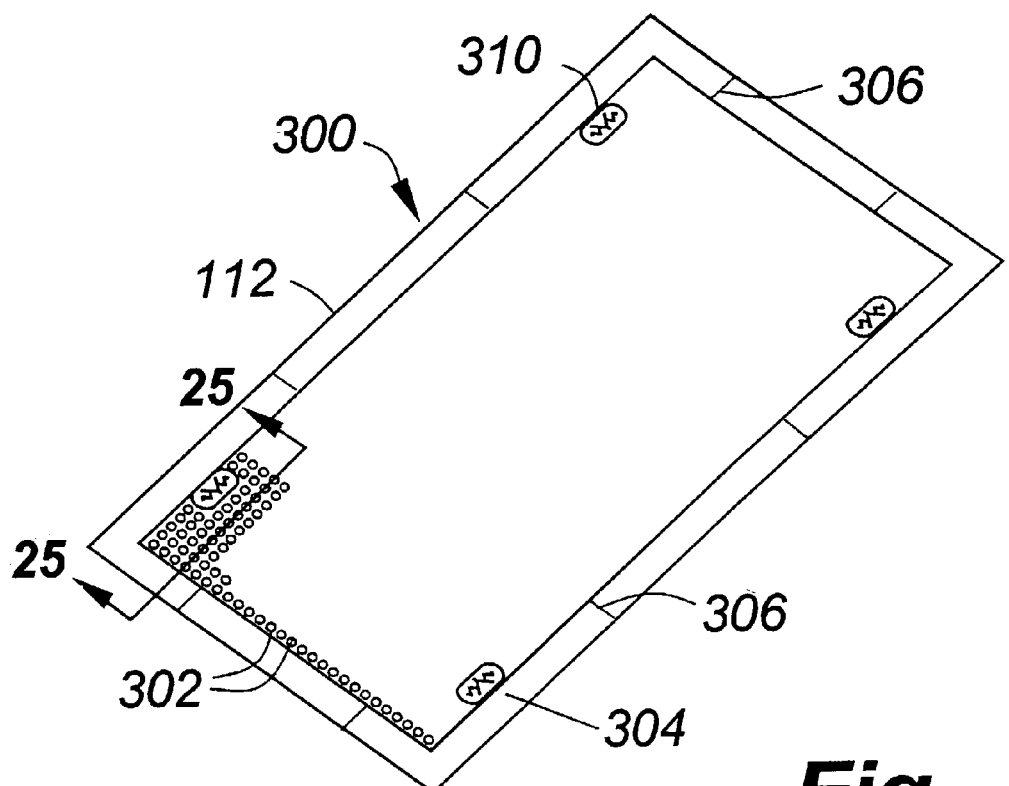
FIG. 24 is bottom view of yet another alternative embodiment of a base for use with the present invention.
Figure 25:
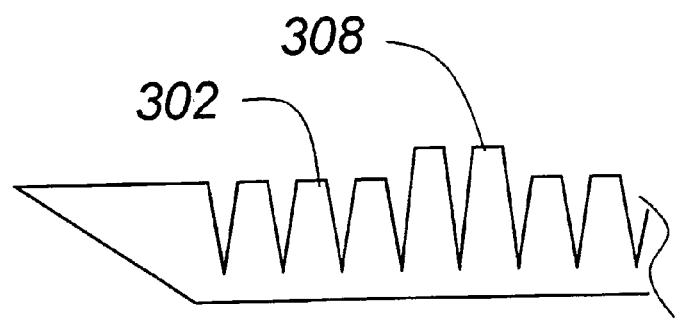
FIG. 25 is a cross-sectional view taken along lines 25—25 in FIG. 24.

FIG. 24 shows the underside of a mat base 300. In this embodiment, the base 300 has a plurality of downwardly extending fingers or nubs 302 which define the majority of the lower surface of the base 300. As with previous embodiments, the base 300 preferably has gripping members for gripping the cleaning sheet. The base 300 may have a perimeter 304 that may be flat on the underside and sloped on the upper side to ease the transition to the upper surface. An advantage to the use of the fingers 302 is that the mat may be folded or rolled either side-to-side or end-to-end. In this case, the fingers merely spread apart as the base is flexed. The perimeter 304 may have slits 306 at various places along the sides and/or the ends to allow the thicker perimeter 304 to be folded as well. As another alternative, slits may be provided all along each of the sides and/or ends so that the perimeter may be folded in any position, or rolled. That is, the slits will extend upwardly from the lower surface of the perimeter to near the top so that they flex by folding the upper surface onto itself. In embodiments where feet are desired, some of the fingers 302 may be made longer as shown in FIG. 25. The longer fingers are shown at 308. As with prior embodiments, it is preferred that the feet 308 compress when a person stands on the mat. As shown, the fingers 302 and 308 are preferably slightly tapered for mold release purposes. In one embodiment the mat has an overall thickness of the ½ inch or less, with the fingers having a height of approximately ⅜ of an inch or less. With all embodiments, the grippers, such as 310, may be integrally molded with the remainder of the mat, or may be a separable piece that is added to the mat and attached thereto, such as by gluing or heat melt.

Figure 26:
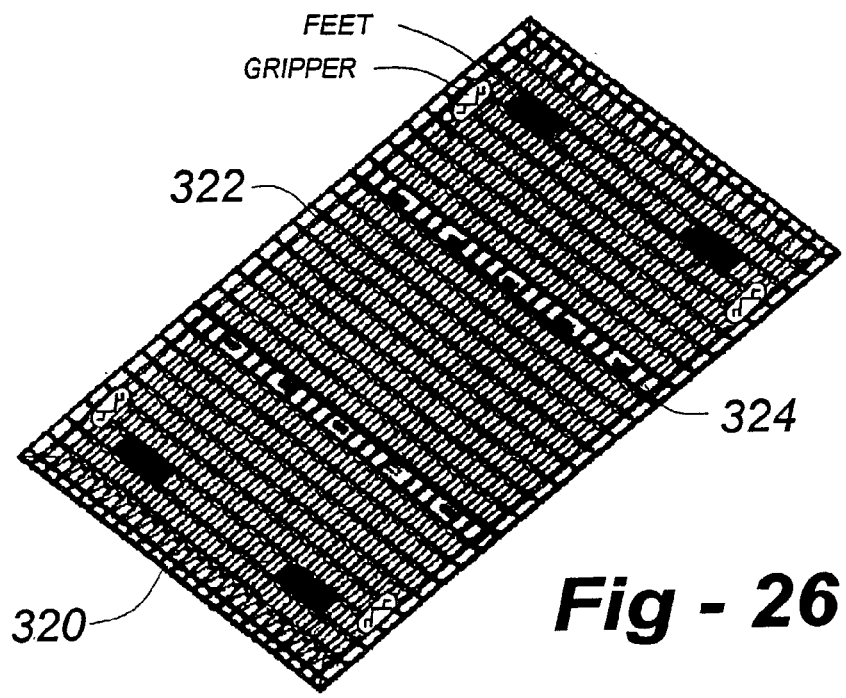
FIG. 26 is a bottom view of another design for the base.
Figure 27:
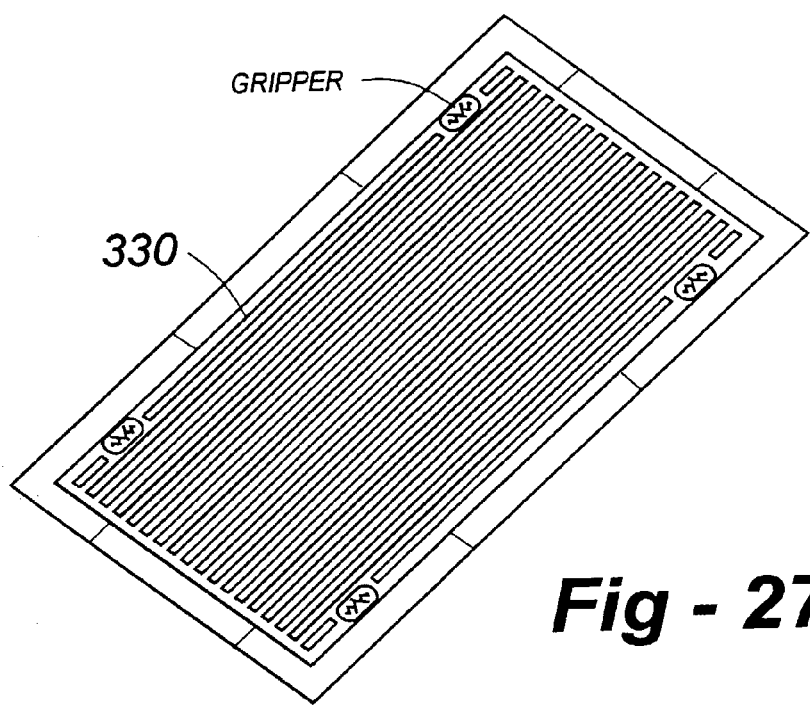
FIG. 27 is a bottom view of yet another design for the bottom of the base.
Figure 28:
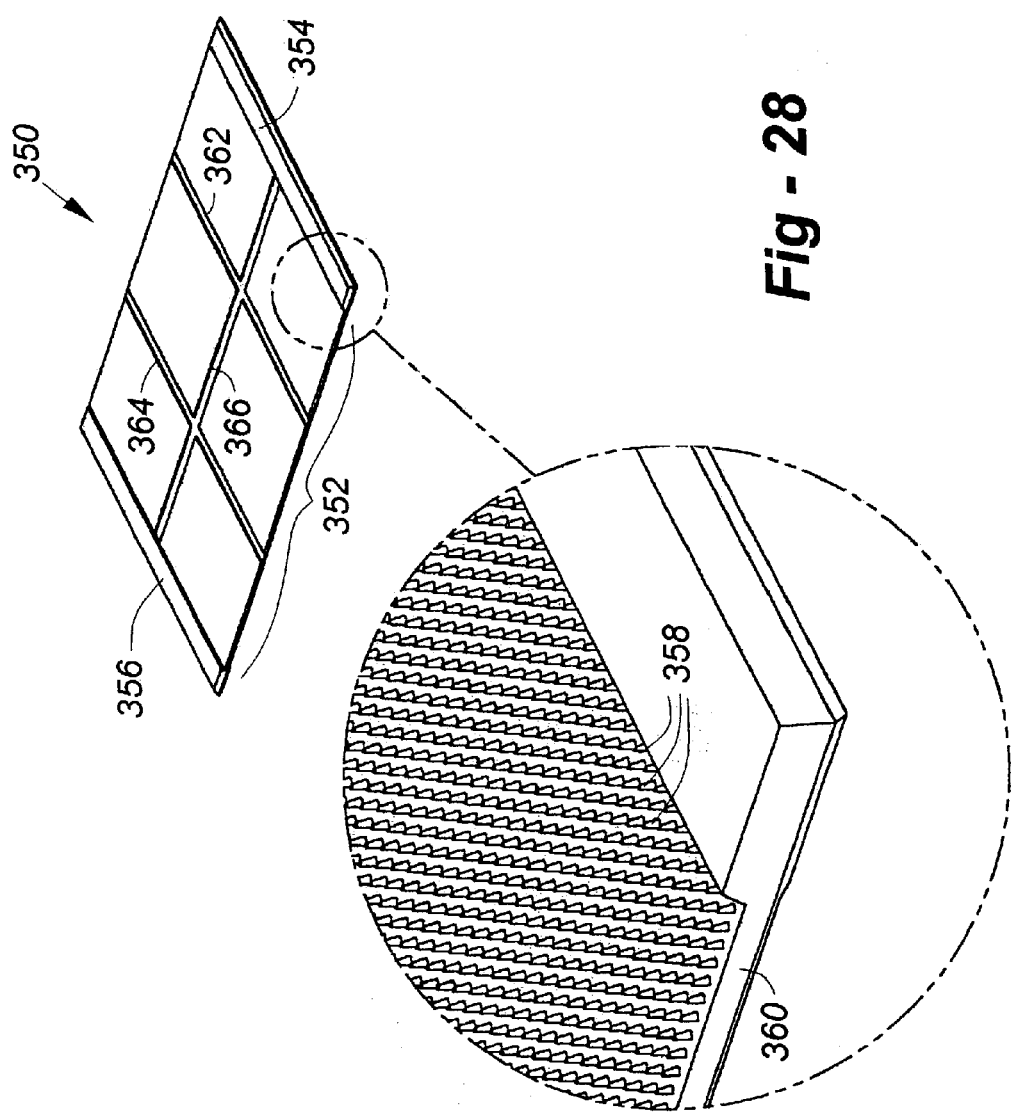
FIG. 28 is a perspective view of yet another embodiment of the base for use with the present invention.

Referring now to FIG. 26, an alternative configuration of the underside of a mat 320 is shown. In this case, the underside has a waffle or box pattern of ribs that extend downwardly from the upper surface. These ribs 322 have a lower end that defines much of the lower surface of the mat 320. As shown, the mat may have relieved areas 324 which may be cut or otherwise left so that the base 320 may be folded at these points. Feet may be provided by attaching them to the bottom, or the ribs may be longer in some areas. FIG. 27 shows yet a further alternative. In this embodiment, the bottom surface is defined by a plurality of generally parallel ribs or walls 330 that extend downwardly from the upper surface. Because the walls 330 are generally parallel to each other, the mat may be folded in such a way that the walls spread apart from one another. Alternatively, the walls may be run front-to-back so that folding may be done side-to-side. Feet may be added if desired, and the grippers may be integrally formed or a separate piece. Again, any of the embodiments of the base may be made from a variety of materials, including plastics and rubber. The use of walls or fingers reduces the overall material usage on the base, thereby saving material cost. However, as an alternative, the base may be mostly a solid piece of material with slits running side-to-side or front-to-back to allow it to be rolled or folded.

Referring now to FIGS. 28–32, yet another embodiment of a mat base 350 will be described. The base 350 has a central section 352 and a pair of side edge portions 354 and 356 that define opposite side edges of the base 350. The base 350 may be made out of a variety of materials, though it is preferred that at least the side portions 354 and 356 are formed of a non-slip material and that the base be sufficiently heavy so as to remain in place. As shown in the detailed portion of FIG. 28, the central portion 352 has a plurality of fingers, pins, or teeth 358 extending upwardly from a central generally planar member 360. The generally planar member 360 extends between and interconnects the side portions 354 and 356. The fingers or teeth 358, in one embodiment, cover the entire central planar member 360 and may be randomly arranged or arranged at regular intervals, as shown. In the illustrated embodiment, the central planar member 360 has portions shaped as strips that are not covered by the teeth 358. These areas or strips allow for easier folding of the base for shipping, storing, or for installation of the disposable cover, as will be described herein below.

In the illustrated embodiment, the folding zones or strips include a pair of strips 362 and 364 that extend front-to-rear of the base 350 and a single strip 366 that runs side-to-side between the side portions 354 and 356. In the illustrated embodiment, each of the strips 362–364 is a band in which teeth 358 are not provided. In addition, as best shown in FIG. 30, the central member 360 is also thinner in the areas of the strips. FIG. 30 shows a cross-sectional view of the mat and shows strip 364. This thinning of the member 360 makes the base easier to fold either side-to-side or end-to-end. As also shown in FIG. 30, the member 360 has teeth or fingers provided on both the upper and lower surfaces. Preferably, strips such as 362–366 are also provided on the lower surface, in alignment with the strips of the upper surface, to further ease folding. The thickness of the member 360, the height of the teeth 358 and the thickness of the end portions 354 and 356 are chosen such that the teeth preferably do not extend through the plans defined by the upper and lower surfaces of the end portions 354 and 356.

Referring now to FIG. 31, the pins or teeth 358 will be described in more detail. In one preferred embodiment the teeth 358 are generally cone-shaped with a generally circular base with a diameter A of approximately 0.062 inches. The teeth 358 taper upwardly from the base to a narrower upper end. The teeth 358 have an overall height of approximately 0.125 inches, while the top has a radius of curvature of approximately 0.015 inches. The sides of the teeth taper at approximately 8 degrees. The teeth 358 may be randomly scattered or may be arranged in regular intervals. In one preferred embodiment the center-to-center spacing E of the teeth 358 is approximately 0.19 inches. Referring again to FIG. 30, the end portions 354 and 356 preferably have a thickness, for this embodiment, of approximately 0.5 inches, while the majority of the member 360 has a thickness of approximately 0.25 inches. In embodiments where the strips 362–364 are thin, they have a top-to-bottom thickness of approximately 0.125 inches and a side-to-side or front-to-back width of approximately 0.75 inches. The perimeter of the base is preferably angled or tapered, as best shown in FIG. 30. The angle of this taper, in one embodiment, is approximately 45 degrees and has a width of approximately 0.25 inches.

As will be appreciated by those of skill in the art, the base 350 is preferably symmetrical such that it may be flipped top-to-bottom so as to change which surface of the base is exposed. Alternatively, the bottom side may be flat such that only the top surface is used for wiping and the bottom is designed to be against the floor. In this case, the perimeter may be sloped to meet the floor, as with earlier embodiments.

Referring now to FIG. 32, a cross-sectional end view of the base 350 is shown with a disposable sleeve 370 positioned thereon. As shown, the sleeve 370 is a loop that extends across the upper and lower surfaces of the base and is engaged by the teeth. The sleeve 370 takes several forms. In one preferred embodiment, such as illustrated, the sleeve 370 is a single sheet of fabric or fabric-like material that extends across the top and bottom of the base 350. In this embodiment, the sleeve 370 does not have a backing layer, such as a plastic. The sleeve 370 may be perforated at its edges to allow removal when soiled. As an alternative, shown in the detailed blow-up of FIG. 32, the sleeve 370 may take the form of an upper sheet 372 and a lower sheet 374 that are bonded to one another at a junction zone 376. They may be joined together at each of the sides or may be a single sheet that is bonded to itself at only one position. To remove the soiled sleeve 370 from the base 350, the sleeve is separated at the junction region 376, such as by separating the heat bonded or adhesive bonded region. Alternatively, the fabric layer may be backed by a reinforcement layer, such as plastic or Tyvek® with the layers bonded together, and then two such two layer sheets can be edge bonded to form a sleeve. Or, the lower sheet can be just a reinforcement layer designed to hold the upper sheet on the base. A tab 378 may be provided on one or both sides of an upper sheet to aid in removal of soiled sheets. In one embodiment, tabs are provided adjacent each side so that the user may grasp two tabs and pull them towards one another so that dirt is captured into the folding upper surface.

Installation of the sleeve 370 onto the base 350 may be accomplished in a variety of ways. In one preferred approach, the base is folded onto itself in a taco-shape. For this purpose, it is folded along strip 366. The sleeve 370 may then be slid over the base, which is now much narrower than in the unfolded position, and the base is released so as to fill the sleeve. Preferably, the sleeve is shipped and sold in a folded configuration. In this case, one fold will be down the center of the long direction, thereby "marking" the center of the sleeve. Preferably, the taco-folded base is aligned with this center line prior to being released so that the sleeve is properly positioned. Alternatively, the sleeve may have an actual marking to assist in positioning the sleeve. The sleeve may be formed of a material that allows it to stretch slightly so that it remains snug on the base 350. However, in one preferred embodiment, the sleeve is a non-woven material with a scrim reinforcement so as to limit the amount of stretching. The sleeve 370 is then gripped by the teeth 358, which may extend partially or completely through all or portions of the sleeve 370. In this way, the upper ends of the teeth grip the sleeve and also may extend slightly through so as to provide an enhanced wiping surface for shoes or feet. In alternative embodiments, the base 350 may have springy edges along the elongated edges so as to stretch the sleeve 370. For example, wires or flexible members may arc out along the edges in the plane of the base so as to form arch-like shapes that stretch the sleeve.

Another approach to installing the sleeve 370 onto the base is to provide the sleeve as a sheet that is wrapped about the base and two edges are then joined, such as by adhesive. In another embodiment of the sleeve 370 the woven or non-woven fabric or fabric-like material is backed with a reinforcement or moisture barrier layer. This layer may help to strengthen the sleeve, but may also assist in sliding the sleeve over the folded base. The base 350 may also be folded in other ways, such as providing two folding zones so that it may be Z-folded to further reduce its width. In yet other embodiments, the sleeve 370 may be multiple layers with the outer layer peeled off, as was discussed with earlier embodiments of the present invention. The embodiment of the invention shown in FIGS. 28–32 may be used with any of the previously discussed versions of refills or cleaning sheets, including those with margins that are not covered by a fabric-like material. In embodiments where only the top of the base is used for wiping, a sleeve may be provided that can be rotated about the base to bring the "bottom" part of the sleeve to the top. The sleeves are preferably provided as refills, and will may have multiple sleeves in a package. Also, the sleeves may be provided pretreated, as discussed previously for other refills.

Figure 33:
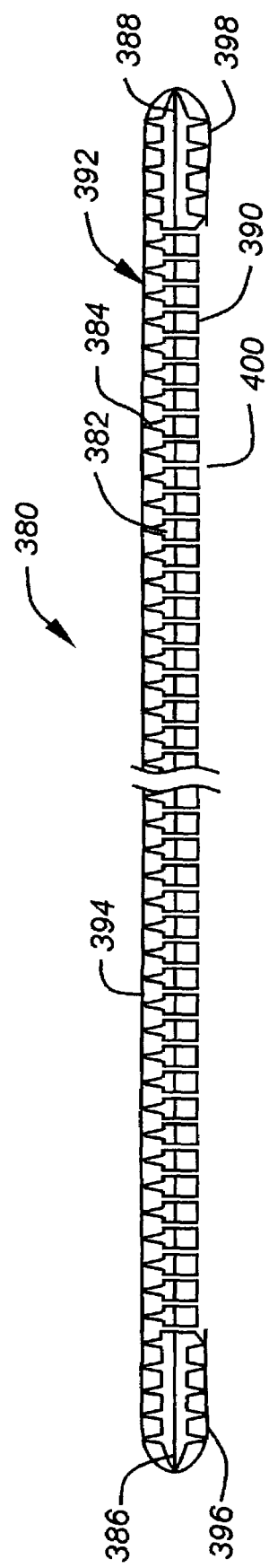
FIG. 33 is a cross-sectional end view of an alternative embodiment of a base within an alternative embodiment of a cleaning sheet disposed thereon.

Referring now to FIG. 33, an alternative embodiment of a cleaning mat system 380 will be described. This embodiment is similar to the mat system 350 previously described, but is designed for use with a cleaning sheet rather than a cleaning sleeve. As shown in this cross-sectional view, the cleaning mat system 380 includes a base 382 with an upper and lower surface, and a plurality of teeth 384 extending from the upper surface. These teeth 384 cover the majority of the upper surface of the base 382. As with the previous embodiment, this base 382 preferably has side portions that are not covered by teeth and assists in maintaining the base in position on a floor. The base 382 may have a lower surface that is substantially identical to the upper surface, with teeth covering the majority of the surface. Alternatively, the lower surface may be as illustrated in FIG. 33, with teeth provided only near the leading and trailing edges 386 and 388. In the illustrated embodiment, a central area 390 between the leaving and trailing edges 386 and 388 does not have teeth, but is instead slightly thinner and generally flat. The cleaning sheet 392 has a central portion 394 that is disposed on the upper surface of the base 382 and a pair of side edge portions 396 and 398 that wrap around the leading and trailing edges 386 and 388. The cleaning sheet may take any of the forms previously discussed, but it is preferably a non-woven material that is absorbent and breathable. By wrapping the edge portions 396 and 398 around the leading and trailing edges 386 and 388, the side edge portions become trapped between the teeth on the lower surface and the floor when the base is in a use position on the floor. This causes the teeth to grip these side edge portions and help to retain the cleaning sheet 392 in position. As with the prior embodiment, the teeth 384 preferably slightly penetrate the central portion 394 of the cleaning sheet 392 when pressure is applied against the cleaning sheet. As shown, the base 382 preferably has holes 400 defined from the upper surface to the lower surface between the teeth 382. This allows air circulation to dry the cleaning sheet 392 and the base 382. Such perforations may also be provided in prior embodiments of the base, as well as the version of the present embodiment wherein teeth are provided across the other underside.

The above discussed embodiments of the present invention are preferably intended for use on floors of residences and businesses. However, the present invention may also have application on other surfaces. For example, the present invention, as is or modified, is highly suitable for use on the floors of a vehicle, such as a car or truck. Preferably, the above embodiments are slightly modified so as to provide a floor mat base shaped to fit in the vehicle footwell, as is the case with typical vehicle floor mats. In one version, the floor mat is configured as shown in FIG. 32. That is, the floor mat base has a plurality of upwardly extending and/or downwardly extending teeth and a cleaning sheet or sleeve is wrapped about the base. The cleaning sheet may cover the entire floor mat, or only a portion thereof. For example, the cleaning sheet or sleeve preferably at least covers the area where a driver's feet typically rest. In an alternative embodiment, the base is designed as shown in FIG. 33, with teeth on the upper side and just near the edges of the underside. Holes through the mat may be provided in any of the embodiments. A cleaning sheet is then wrapped about at least a portion of the base and wrapped under to be engaged by the teeth on the lower edge. As yet a further embodiment, cleaning sheets according to the present invention may be provided to be wrapped about floor mats that are currently used in vehicles. As is known to those of skill in the art, floor mats in vehicles often have downwardly extending teeth on the underside to help retain them in position in the vehicle. A cleaning sheet according to the present invention may be wrapped about such a floor mat, whether carpeted or rubber, and have the edges wrapped under such that they are gripped by the existing teeth on the underside of the mat. With any of these car specific embodiments, the cleaning sheets may use any of the previously discussed cleaning sheet technology. That is, the sheets may be a single fabric layer, may be an absorptive layer with a barrier layer, may include extra absorbency or fragrance or anti-microbial substances, and may include multiple tear-off sheets using any of the attachment systems previously discussed. A car floor mat may also be provided using the design of earlier embodiments of the present invention wherein grippers are provided for gripping the edges of the refill. As another alternative, cleaning sheets for use on existing floor mats may have a coating of adhesive partially or completely covering the backside so that the sheet sticks to the existing floor mat. This may be used with or without the edges wrapping around it being engaged by the teeth on the underside of the mat. A floor mat base may also be provided according to the present invention that is designed for use with or without a cleaning sheet in a vehicle. For example, the floor mat may be designed so as to have a rubber or carpeted upper surface with or without upwardly extending teeth, and be specifically designed to grip a refill as it wraps around the edges, or to receive a sleeve.

As will be clear to those of skill in the art, the illustrated and discussed embodiments of the present invention may be modified in various ways without departing from the scope or teaching of the present invention. It is the following claims, including all equivalents, which define the scope of the invention.

The invention claimed is:

1. A cleaning mat system for placement on a floor and for cleaning the undersides of shoes, feet, and other objects, said cleaning mat system comprising:

a base having an upper surface and a lower surface interconnected by a perimeter edge, said perimeter edge including a leading edge, an opposed trailing edge and a pair of side edges extending between the leading and trailing edges, said upper surface of said base including a plurality of upwardly extending teeth covering the majority of said upper surface, said lower surface of said base being configured to be disposed against the floor when the base is in a use position, the lower surface having a plurality of downwardly extending teeth covering at least a portion of said lower surface adjacent said leading edge and at least a portion of said lower surface adjacent said trailing edge; and a removable and disposable cleaning sheet having an upper face for cleaning and an opposed lower face, said cleaning sheet having a pair of spaced apart side edge portions and a central portion therebetween, said cleaning sheet comprising a fabric layer operative to clean an object which contacts said upper face;

said cleaning sheet having a use position wherein said sheet is disposed on said base such that said lower face of said central portion is adjacent said upper surface of said base and said central portion of said sheet is partially penetrated by said plurality of teeth when said central portion of said sheet is pressed against said teeth, one of said side edge portions of said cleaning sheet wrapping about said leading edge of said base and being disposed against said lower surface such that said one side edge portion is disposed between said teeth adjacent said leading edge and the floor when the base is in the use position, and the other of said side edge portions wrapping about said trailing edge of said base and being disposed against said lower surface such that said other side edge portion is disposed between said teeth adjacent said trailing edge and the floor when the base is in the use position;

whereby said cleaning sheet is retained on said base with said upper face directed upwardly to clean an object that contacts said cleaning mat system, and said teeth on said upper surface assist in maintaining said sheet in position and assist in wiping an object which moves against said upper face of said cleaning sheet.

2. The cleaning mat system according to claim 1, wherein said plurality of downwardly extending teeth on said lower surface of said base cover the majority of said lower surface.

3. The cleaning mat system according to claim 2, wherein said upper and said lower surfaces of said base are substantially identical.

4. The cleaning mat system according to claim 1, wherein said base comprises a side portion adjacent each of said side edges and a midportion extending between said side portions, said upwardly extending and said downwardly extending teeth being disposed on said midportion and not on said side portions.

5. The cleaning mat system according to claim 4, wherein said cleaning sheet is sized such that said central portion of said cleaning sheet covers said upper surface of said midportion and does not cover said side portions, said side portions having a thickness equal to or greater than a thickness of said midportion such that said side portions contact the floor and assist in preventing movement of said base on the floor when the base is in the use position.

6. The cleaning mat system according to claim 5, wherein said side portions are formed of a rubber-like material that resists movement with respect to the floor when the base is in the use position.

7. The cleaning mat system according to claim 1, wherein said base has a plurality of holes defined from said upper surface to said lower surface to allow air circulation from said upper surface to said lower surface of said base, said holes being defined between said teeth.

8. The cleaning mat system according to claim 1, wherein said cleaning sheet further comprises a reinforcement layer, said fabric layer defining said upper face of said cleaning sheet and said reinforcement layer defining said lower face of said cleaning sheet.

9. The cleaning mat system according to claim 8, wherein said fabric layer of said cleaning sheet comprises a bibulous layer and said lower reinforcement layer comprises a moisture barrier layer.

10. The cleaning mat system according to claim 1, wherein said fabric layer further comprising a moisture absorbing material added to said fabric layer.

11. The cleaning mat system according to claim 1, wherein said fabric layer comprises a non-woven material.

12. The cleaning mat system according to claim 1, wherein said fabric layer is reinforced with a scrim.

13. The cleaning mat system according to claim 1, wherein said cleaning sheet is absorbent, said upper face of said cleaning sheet having an adhesive covering only a portion of said upper face and operative to grab and retain dirt and debris that comes in contact with said upper face, a portion of said upper face remaining non-occluded such that absorbency is maintained.

14. The cleaning mat system according to claim 1, wherein said cleaning sheet is imbibed with an anti-microbial substance.

15. The cleaning mat system according to claim 1, wherein said cleaning sheet is imbibed with a fragrance.

16. The cleaning mat system according to claim 1, wherein said base comprises multiple sections which may be assembled to form said base and disassembled for storage.

17. The cleaning mat system according to claim 1, wherein said base comprises at least one slit defined in said upper or said lower surface, said at least one slit extending partially through said base and running from said leading edge to said trailing edge such that said base may be folded at said slit for storage.

* * * * *